US012568388B2

(12) United States Patent
Jiao et al.

(10) Patent No.: US 12,568,388 B2
(45) Date of Patent: Mar. 3, 2026

(54) COMMUNICATION METHOD AND APPARATUS

(71) Applicant: HUAWEI TECHNOLOGIES CO., LTD., Guangdong (CN)

(72) Inventors: Chunxu Jiao, Shanghai (CN); Wenting Guo, Shanghai (CN); Pu Yuan, Shenzhen (CN); Lei Lu, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 528 days.

(21) Appl. No.: 17/749,571

(22) Filed: May 20, 2022

(65) Prior Publication Data

US 2022/0286883 A1     Sep. 8, 2022

Related U.S. Application Data

(63) Continuation of application No. PCT/CN2020/129276, filed on Nov. 17, 2020.

(30) Foreign Application Priority Data

Nov. 22, 2019    (CN) .......................... 201911154613.X

(51) Int. Cl.
  *H04W 24/08*      (2009.01)
  *H04L 5/00*       (2006.01)

(52) U.S. Cl.
  CPC ........... *H04W 24/08* (2013.01); *H04L 5/0048* (2013.01)

(58) Field of Classification Search
  None
  See application file for complete search history.

(56) References Cited

U.S. PATENT DOCUMENTS

| | | | | |
|---|---|---|---|---|
| 2013/0322376 A1* | 12/2013 | Marinier | ............... | H04L 1/0027 |
| | | | | 370/329 |
| 2019/0028167 A1* | 1/2019 | Chang | .................... | H04B 7/063 |
| 2019/0149211 A1* | 5/2019 | Nilsson | ................ | H04B 7/0626 |
| | | | | 375/267 |

(Continued)

FOREIGN PATENT DOCUMENTS

| | | |
|---|---|---|
| CN | 109417717 A | 3/2019 |
| CN | 109565392 A | 4/2019 |

(Continued)

OTHER PUBLICATIONS

3GPP TR 37.885 V15.3.0 (Jun. 2019), "3rd Generation Partnership Project; Technical Specification Group Radio Access Network; Study on evaluation methodology of new Vehicle-to-Everything (V2X) use cases for LTE and NR; ( Release 15)," Jun. 2019, 38 pages.

(Continued)

*Primary Examiner* — Adnan Baig
(74) *Attorney, Agent, or Firm* — Fish & Richardson P.C.

(57) ABSTRACT

The method includes: receiving, by a second electronic device, K panel specific reference signals from a first electronic device by using N panels, wherein the panel specific reference signal is related to an identifier of a panel that is of the first electronic device and that sends the panel specific reference signal, and N and K are each an integer greater than or equal to 2; and measuring, by the second electronic device, signal quality of the K panel specific reference signals.

20 Claims, 10 Drawing Sheets

Panel configuration

Antenna configuration 0.5 wavelength

Configuration 1

(56) References Cited

U.S. PATENT DOCUMENTS

| | | | | |
|---|---|---|---|---|
| 2019/0335400 A1 | 10/2019 | Gong et al. | | |
| 2020/0351140 A1* | 11/2020 | Tang | | H04L 27/2675 |
| 2021/0344397 A1* | 11/2021 | Lee | | H04L 5/0048 |
| 2021/0385039 A1* | 12/2021 | Cha | | H04J 13/0029 |
| 2022/0278719 A1* | 9/2022 | Li | | H04W 24/10 |
| 2022/0279360 A1* | 9/2022 | Matsumura | | H04L 5/0017 |

FOREIGN PATENT DOCUMENTS

| | | | |
|---|---|---|---|
| CN | 109637453 A | 4/2019 | |
| CN | 110071749 A | 7/2019 | |
| CN | 110114990 A | 8/2019 | |
| CN | 110140301 A | 8/2019 | |
| CN | 110169116 A | 8/2019 | |
| CN | 110224802 A | 9/2019 | |
| CN | 110352583 A | 10/2019 | |
| WO | 2017080132 A1 | 5/2017 | |
| WO | 2018031807 A1 | 2/2018 | |
| WO | 2019220005 A1 | 11/2019 | |

OTHER PUBLICATIONS

Nokia, Alcatel-Lucent Shanghai Bell, "Dynamic TDD Interference Mitigation Concepts in Nr," 3GPP TSG RAN WG1#88, R1-1703110, Athens, Greece, Feb. 13-17, 2017, 6 pages.

Office Action issued in Chinese Application No. 201911154613.X on Oct. 26, 2021, 18 pages (with English translation).

PCT International Search Report and Written Opinion issued in International Application No. PCT/CN2020/129276 on Feb. 3, 2021, 17 pages (with English translation).

Office Action issued in Chinese Application No. 201911154613.X on Sep. 5, 2022, 4 pages.

AT&T, "Remaining Issues In Multi TRP Transmission," 3GPP TSG RAN WG1 #97, R1-1907171, Reno, USA, May 13-17, 2019, 21 pages.

Fraunhofer et al, "UE Panel-Specific UL Transmission," 3GPP TSG RAN WG1 Meeting AH-1901, R1-1900359, Taipei, Taiwan, Jan. 21-25, 2019, 5 pages.

VIVO, "Further Discussion on Multi-Beam Operation," 3GPP TSG RAN WG1 Meeting #96, R1-1901703, Athens, Greece, Feb. 25-Mar. 1, 2019, 7 pages.

Extended European Search Report in European Appln No. 20888997.2, dated Nov. 28, 2022, 12 pages.

* cited by examiner

Panel configuration

Antenna configuration 0.5 wavelength

Configuration 1

Panel configuration

Antenna configuration 0.5 wavelength 0.5 wavelength

Configuration 2

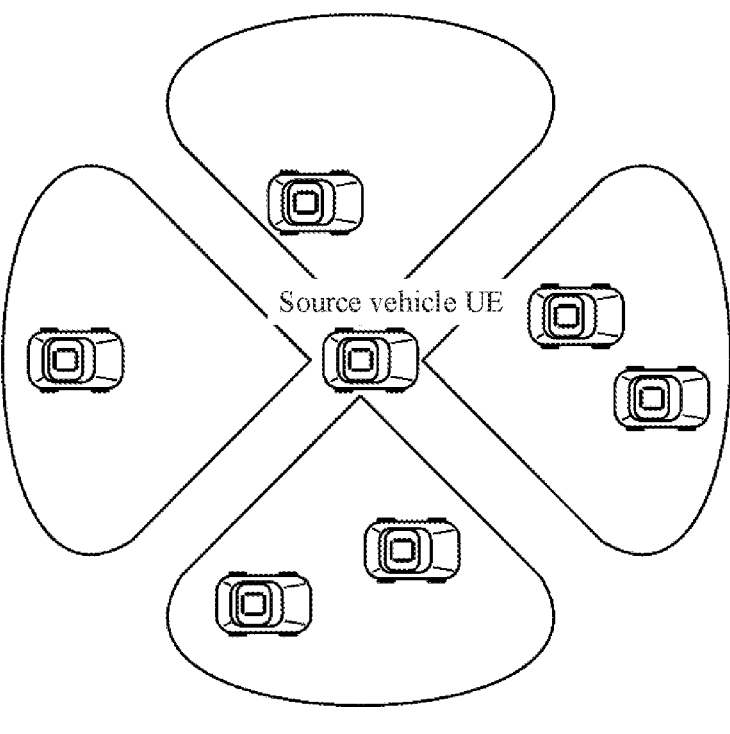

FIG. 5

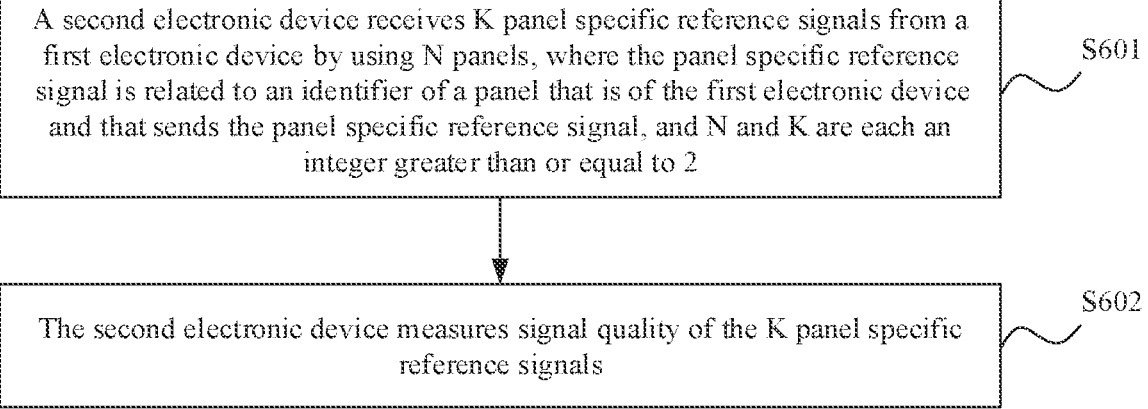

A second electronic device receives K panel specific reference signals from a first electronic device by using N panels, where the panel specific reference signal is related to an identifier of a panel that is of the first electronic device and that sends the panel specific reference signal, and N and K are each an integer greater than or equal to 2　　　S601

The second electronic device measures signal quality of the K panel specific reference signals　　　S602

FIG. 6

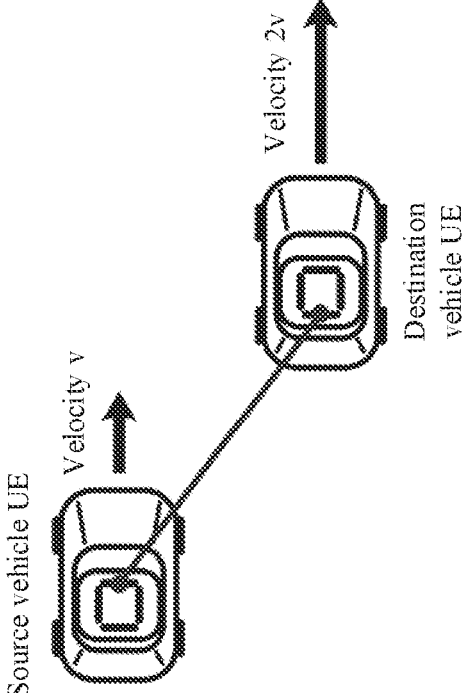
Panel reporting information at a moment t1
| Identifier of a sending panel | Identifier of a receiving panel | RSRP |
|---|---|---|
| 0 | 2 | $P_{2,0}$ |
| 1 | 3 | $P_{3,1}$ |
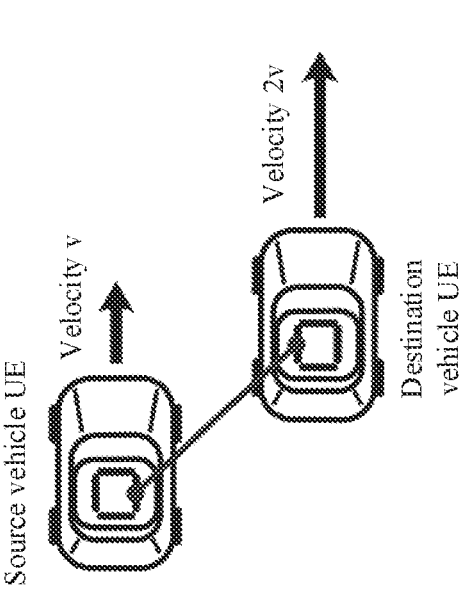
Panel reporting information at a moment $t_0$
| Identifier of a sending panel | Identifier of a receiving panel | RSRP |
|---|---|---|
| 1 | 3 | $P_{3,1}$ |
| 0 | 2 | $P_{2,0}$ |
FIG. 8

COMMUNICATION METHOD AND APPARATUS

CROSS-REFERENCE TO RELATED APPLICATIONS

This application is a continuation of International Application No. PCT/CN2020/129276, filed on Nov. 17, 2020, which claims priority to Chinese Patent Application No. 201911154613.X, filed on Nov. 22, 2019. The disclosures of the aforementioned applications are hereby incorporated by reference in their entireties.

TECHNICAL FIELD

This application relates to communication technologies, and in particular, to a communication method and apparatus.

BACKGROUND

In the communication field, a transmit end usually communicates with a receive end through an antenna. To meet an increasingly high communication requirement of a user, a plurality of antennas are usually disposed in a transmit end and a receive end, and communication is performed through the plurality of antennas.

In a conventional technology, a communication process implemented based on a plurality of antennas is generally as follows: A transmit end selects one transmit antenna to transmit data, and a receive end selects one receive antenna to receive data. For example, a terminal device sends data to a base station, and a quantity of transmit antennas of the terminal device is 2. A process in which the terminal device selects a transmit antenna mainly includes two phases: uplink measurement and downlink control. In the uplink measurement phase, the terminal device sends sounding reference signals (sounding reference signals, SRSs) on different time-frequency resources by using different antennas. The base station separately estimates channel quality of the two antennas of the terminal device by using the received SRSs, and selects a transmit antenna of the terminal device with good channel quality. In a downlink control phase, the base station implicitly includes an antenna selection result in uplink scheduling control information sent to the terminal device. Then, the terminal device performs blind detection on the uplink scheduling control information, obtains the antenna selection result of the base station, and selects an appropriate transmit antenna based on the result.

However, as a quantity of antennas in the transmit end and the receive end continuously increases, especially when the transmit end and the receive end each use a panel that includes an antenna array including several antennas to perform communication, by using a method in the conventional technology, one time-frequency resource needs to be allocated to each antenna port on each panel to send an SRS, and resource overheads are high.

SUMMARY

Embodiments of this application provide a communication method and apparatus, which may be applied to fields such as vehicle-to-everything V2X, or fields such as intelligent driving and intelligent connected vehicles, to resolve a technical problem that resource overheads are high during multi-antenna communication in a conventional technology.

According to a first aspect, an embodiment of this application provides a communication method, including:

A second electronic device receives K panel specific reference signals from a first electronic device by using N panels, where the panel specific reference signal is related to an identifier of a panel that is of the first electronic device and that sends the panel specific reference signal, and N and K are each an integer greater than or equal to 2. The second electronic device measures signal quality of the K panel specific reference signals. That is, a panel is used as a basic selection unit in communication, so that in multi-antenna communication, there is no need to allocate a reference signal resource to each antenna port, and therefore resource overheads are small. Specifically, the first electronic device may send the K panel specific reference signals to the second electronic device by using panels, where the panel specific reference signal is related to the identifier of the panel that is of the first electronic device and that sends the panel specific reference signal. After receiving the K panel specific reference signals by using the N panels, the second electronic device may measure the signal quality of the received K panel specific reference signals, and further select, based on a result of the measurement, a first panel for receiving data sent by the first electronic device and/or sending data to the first electronic device, to communicate with the first electronic device. That is, in this embodiment of this application, instead of using an antenna as a basic selection unit in the conventional technology, a panel that includes an antenna array including several antennas is used as a basic selection unit in communication, so that in multi-antenna communication, there is no need to allocate a reference signal resource to each antenna port, and therefore resource overheads are small.

In a possible design, the method further includes: The second electronic device sends first indication information to the first electronic device by using the first panel, where the first panel is related to the signal quality of the K panel specific reference signals, and the first indication information is indication information related to one or more panels of the first electronic device. In this way, when the first electronic device needs to send data to the second electronic device, the first electronic device may determine, based on the first indication information, a panel for sending the data to the second electronic device. In this process, the first electronic device does not need to measure quality of signals between each panel of the first electronic device and each panel of the second electronic device. This reduces consumption of computing resources of the first electronic device.

In a possible design, the panel specific reference signal includes one or more of the following signals: a first panel specific reference signal, where a pseudo-random sequence initial value of the first panel specific reference signal is related to the identifier of the panel that sends the panel specific reference signal; a second panel specific reference signal, where the second panel specific reference signal is related to at least one of the following: the identifier of the panel that sends the panel specific reference signal, or a pseudo-random sequence initial value of a physical sidelink control channel demodulation reference signal PSCCH DMRS; a third panel specific reference signal, where the third panel specific reference signal is related to at least one of the following: the identifier of the panel that sends the panel specific reference signal, or a pseudo-random sequence initial value of a physical sidelink broadcast channel demodulation reference signal PSBCH DMRS; and a fourth panel specific reference signal, where the fourth panel specific reference signal is related to at least one of the following: the identifier of the panel that sends the panel specific reference signal, or a pseudo-random sequence initial value of a sidelink channel state information reference signal SL-CSI-RS.

In a possible design, for any panel that is of the first electronic device and that sends the panel specific reference signal, an identifier of the panel is $i_{panel\text{-}ID}$; the pseudo-random sequence initial value $C1_{init}$ of the first panel specific reference signal satisfies an equation: $C1_{init}=2^{11}(i_{panel\_ID}+1)+2^6(i_{panel\_ID}+1)$; and/or a pseudo-random sequence initial value $C2_{init}$ of the second panel specific reference signal satisfies an equation: $C2_{init}=(2^1 C2_{init,0}+i_{panel\_ID})\bmod 2^{31}$, where $C2_{init,0}$ is the pseudo-random sequence initial value of the PSCCH DMRS, and 1 is related to a total quantity of panel identifiers defined in a network; and/or a pseudo-random sequence initial value $C3_{init}$ of the third panel specific reference signal satisfies an equation: $C3_{init}=(2^1 C3_{init,0}+i_{panel\_ID})\bmod 2^{31}$, where $C3_{init,0}$ is the pseudo-random sequence initial value of the PSBCH DMRS, and 1 is related to the total quantity of the panel identifiers defined in the network; and/or a pseudo-random sequence initial value $C4_{init}$ of the fourth panel specific reference signal satisfies an equation: $C4_{init}=(2^1 C4_{init,0}+i_{panel\_ID})\bmod 2^{31}$, where $C4_{init0}$ is the pseudo-random sequence initial value of the SL-CSI-RS, and 1 is related to the total quantity of the panel identifiers defined in the network.

In a possible design, the first indication information includes one or more pieces of panel information, and each piece of panel information includes at least one of the following: the identifier of any panel of the first electronic device and a measurement result of a reference signal corresponding to the any panel. Because the first indication information does not include panel identifiers of the second electronic device, consumption of signaling resources can be reduced.

In a possible design, the first indication information includes one or more groups of panel information, and each group of panel information includes at least one of the following: the identifier of any panel of the first electronic device, an identifier of any panel of the second electronic device, or a measurement result of a reference signal corresponding to the group of panel information. Because the first indication information includes panel identifiers of the second electronic device, the first electronic device can learn a situation of the second electronic device.

In a possible design, that a second electronic device receives K panel specific reference signals from a first electronic device by using N panels includes: The second electronic device receives the K panel specific reference signals from the first electronic device in a plurality of time units by using the N panels. In this way, because the panels of the second electronic device receive the panel specific reference signals in a time-division manner, interference between the panel specific reference signals sent between the panels can be avoided, so that the second electronic device can subsequently obtain the relatively accurate measurement result when measuring the signal quality.

Alternatively, the second electronic device receives the K panel specific reference signals from the first electronic device in onetime unit by using the N panels. Because the N panels of the second electronic device simultaneously receive the panel specific reference signals sent by the first electronic device, consumption of time resources for receiving the panel specific reference signals can be reduced.

According to a second aspect, an embodiment of this application provides a communication method, including: A first electronic device obtains M panel specific reference signals. The first electronic device sends K panel specific reference signals to a second electronic device by using M panels, where the first electronic device sends one or more panel specific reference signals on any one of the M panels, the panel specific reference signal is related to an identifier of a panel that sends the panel specific reference signal, M is an integer greater than or equal to 2, and K is an integer greater than or equal to M.

In a possible design, the method further includes: The first electronic device receives first indication information from the second electronic device, where the first indication information is indication information related to one or more panels of the first electronic device.

In a possible design, the panel specific reference signal includes one or more of the following signals: a first panel specific reference signal, where a pseudo-random sequence initial value of the first panel specific reference signal is related to the identifier of the panel that sends the panel specific reference signal: a second panel specific reference signal, where the second panel specific reference signal is related to at least one of the following: the identifier of the panel that sends the panel specific reference signal, or a pseudo-random sequence initial value of a physical sidelink control channel demodulation reference signal PSCCH DMRS; a third panel specific reference signal, where the third panel specific reference signal is related to at least one of the following: the identifier of the panel that sends the panel specific reference signal, or a pseudo-random sequence initial value of a physical sidelink broadcast channel demodulation reference signal PSBCH DMRS; and a fourth panel specific reference signal, where the fourth panel specific reference signal is related to at least one of the following: the identifier of the panel that sends the panel specific reference signal, or a pseudo-random sequence initial value of a sidelink channel state information reference signal SL-CSI-RS.

In a possible design, for any panel that is of the first electronic device and that sends the panel specific reference signal, an identifier of the panel is $i_{panel\text{-}ID}$;

the pseudo-random sequence initial value $C1_{init}$ of the first panel specific reference signal satisfies an equation: $C1_{init}=2^{11}(i_{panel\_ID}+1)+2^6(i_{panel\_ID}+1)$; and/or a pseudo-random sequence initial value $C2_{init}$ of the second panel specific reference signal satisfies an equation: $C2_{init}=(2^1 C2_{init,0}+i_{panel\_ID})\bmod 2^{31}$, where $C2_{init,0}$ is the pseudo-random sequence initial value of the PSCCH DMRS, and 1 is related to a total quantity of panel identifiers defined in a network; and/or a pseudo-random sequence initial value $C3_{init}$ of the third panel specific reference signal satisfies an equation: $C3_{init}=(2^1 C3_{init,0}+i_{panel\_ID})\bmod 2^{31}$, where $C3_{init,0}$ is the pseudo-random sequence initial value of the PSBCH DMRS, and 1 is related to the total quantity of the panel identifiers defined in the network; and/or a pseudo-random sequence initial value $C4_{init}$ of the fourth panel specific reference signal satisfies an equation: $C4_{init}=(2^1 C4_{init,0}+i_{panel\_ID})\bmod 2^{31}$, where $C4_{init0}$ is the pseudo-random sequence initial value of the SL-CSI-RS, and 1 is related to the total quantity of the panel identifiers defined in the network.

In a possible design, the first indication information includes one or more pieces of panel information, and each piece of panel information includes at least one of the following: the identifier of any panel of the first electronic device and a measurement result of a reference signal corresponding to the any panel.

In a possible design, the first indication information includes one or more groups of panel information, and each group of panel information includes at least one of the following: the identifier of any panel of the first electronic device, an identifier of any panel of the second electronic device, or a measurement result of a reference signal corresponding to the group of panel information.

In a possible design, that the first electronic device sends K panel specific reference signals to a second electronic device by using M panels includes: The first electronic device sends the K panel specific reference signals to the second electronic device in a plurality of time units sequentially by using the M panels: or the first electronic device sends the K panel specific reference signals to the second electronic device in one time unit by using the M panels.

According to a third aspect, an embodiment of this application provides a second electronic device, including: a receiving module, configured to receive K panel specific reference signals from a first electronic device by using N panels, where the panel specific reference signal is related to an identifier of a panel that is of the first electronic device and that sends the panel specific reference signal, and N and K are each an integer greater than or equal to 2; and a processing module, configured to measure signal quality of the K panel specific reference signals.

In a possible design, the second electronic device further includes: a sending module, configured to send first indication information to the first electronic device by using a first panel, where the first panel is related to the signal quality of the K panel specific reference signals, and the first indication information is indication information related to one or more panels of the first electronic device.

In a possible design, the panel specific reference signal includes one or more of the following signals: a first panel specific reference signal, where a pseudo-random sequence initial value of the first panel specific reference signal is related to the identifier of the panel that sends the panel specific reference signal; a second panel specific reference signal, where the second panel specific reference signal is related to at least one of the following: the identifier of the panel that sends the panel specific reference signal, or a pseudo-random sequence initial value of a physical sidelink control channel demodulation reference signal PSCCH DMRS; a third panel specific reference signal, where the third panel specific reference signal is related to at least one of the following: the identifier of the panel that sends the panel specific reference signal, or a pseudo-random sequence initial value of a physical sidelink broadcast channel demodulation reference signal PSBCH DMRS; and a fourth panel specific reference signal, where the fourth panel specific reference signal is related to at least one of the following: the identifier of the panel that sends the panel specific reference signal, or a pseudo-random sequence initial value of a sidelink channel state information reference signal SL-CSI-RS.

In a possible design, for any panel that is of the first electronic device and that sends the panel specific reference signal, an identifier of the panel is $i_{panel\text{-}ID}$;

the pseudo-random sequence initial value $C1_{init}$ of the first panel specific reference signal satisfies an equation: $C1_{init}=2^{11}(i_{panel\_ID}+1)+2^{6}(i_{panel\_ID}+1)$, and/or a pseudo-random sequence initial value $C2_{init}$ of the second panel specific reference signal satisfies an equation: $C2_{init}=(2^{1}C2_{init,0}+i_{panel\_ID})\bmod 2^{31}$, where $C2_{init,0}$ is the pseudo-random sequence initial value of the PSCCH DMRS, and 1 is related to a total quantity of panel identifiers defined in a network; and/or a pseudo-random sequence initial value $C3_{init}$ of the third panel specific reference signal satisfies an equation: $C3_{init}=(2^{1}C3_{init,0}+i_{panel\_ID})\bmod 2^{31}$, where $C3_{init,0}$ is the pseudo-random sequence initial value of the PSBCH DMRS, and 1 is related to the total quantity of the panel identifiers defined in the network; and/or a pseudo-random sequence initial value $C4_{init}$ of the fourth panel specific reference signal satisfies an equation: $C4_{init}=(2^{1}C4_{init,0}+i_{panel\_ID})\bmod 2^{31}$, where $C4_{init0}$ is the pseudo-random sequence initial value of the SL-CSI-RS, and 1 is related to the total quantity of the panel identifiers defined in the network.

In a possible design, the first indication information includes one or more pieces of panel information, and each piece of panel information includes at least one of the following: the identifier of any panel of the first electronic device and a measurement result of a reference signal corresponding to the any panel.

In a possible design, the first indication information includes one or more groups of panel information, and each group of panel information includes at least one of the following: the identifier of any panel of the first electronic device, an identifier of any panel of the second electronic device, or a measurement result of a reference signal corresponding to the group of panel information.

In a possible design, the receiving module is specifically configured to: receive the K panel specific reference signals from the first electronic device in a plurality of time units by using the N panels; or receive the K panel specific reference signals from the first electronic device in one time unit by using the N panels.

According to a fourth aspect, an embodiment of this application provides a first electronic device, including: a processing module, configured to obtain M panel specific reference signals; and a sending module, configured to send K panel specific reference signals to a second electronic device by using M panels, where the first electronic device sends one or more panel specific reference signals on any one of the M panels, the panel specific reference signal is related to an identifier of a panel that sends the panel specific reference signal, M is an integer greater than or equal to 2, and K is an integer greater than or equal to M.

In a possible design, the first electronic device further includes: a receiving module, configured to receive first indication information from the second electronic device, where the first indication information is indication information related to one or more panels of the first electronic device.

In a possible design, the panel specific reference signal includes one or more of the following signals: a first panel specific reference signal, where a pseudo-random sequence initial value of the first panel specific reference signal is related to the identifier of the panel that sends the panel specific reference signal: a second panel specific reference signal, where the second panel specific reference signal is related to at least one of the following: the identifier of the panel that sends the panel specific reference signal, or a pseudo-random sequence initial value of a physical sidelink control channel demodulation reference signal PSCCH DMRS; a third panel specific reference signal, where the third panel specific reference signal is related to at least one of the following: the identifier of the panel that sends the panel specific reference signal, or a pseudo-random sequence initial value of a physical sidelink broadcast channel demodulation reference signal PSBCH DMRS; and a fourth panel specific reference signal, where the fourth panel specific reference signal is related to at least one of the following: the identifier of the panel that sends the panel specific reference signal, or a pseudo-random sequence initial value of a sidelink channel state information reference signal SL-CSI-RS.

In a possible design, for any panel that is of the first electronic device and that sends the panel specific reference signal, an identifier of the panel is $i_{panel\_ID}$;

the pseudo-random sequence initial value $C1_{init}$ of the first panel specific reference signal satisfies an equation: $C1_{init}=2^{11}(i_{panel\_ID}+1)+2^6(i_{panel\_ID}+1)$; and/or a pseudo-random sequence initial value $C2_{init}$ of the second panel specific reference signal satisfies an equation: $C2_{init}=(2^1 C2_{init,0}+i_{panel\_ID})\bmod 2^{31}$, where $C2_{init,0}$ is the pseudo-random sequence initial value of the PSCCH DMRS, and 1 is related to a total quantity of panel identifiers defined in a network; and/or a pseudo-random sequence initial value $C3_{init}$ of the third panel specific reference signal satisfies an equation: $C3_{init}=(2^1 C3_{init,0}+i_{panel\_ID})\bmod 2^{31}$, where $C3_{init,0}$ is the pseudo-random sequence initial value of the PSBCH DMRS, and 1 is related to the total quantity of the panel identifiers defined in the network; and/or a pseudo-random sequence initial value $C4_{init}$ of the fourth panel specific reference signal satisfies an equation: $C4_{init}=(2^1 C4_{init,0}+i_{panel\_ID})\bmod 2^{31}$, where $C4_{init,0}$ is the pseudo-random sequence initial value of the SL-CSI-RS, and 1 is related to the total quantity of the panel identifiers defined in the network.

In a possible design, the first indication information includes one or more pieces of panel information, and each piece of panel information includes at least one of the following: the identifier of any panel of the first electronic device and a measurement result of a reference signal corresponding to the any panel.

In a possible design, the first indication information includes one or more groups of panel information, and each group of panel information includes at least one of the following: the identifier of any panel of the first electronic device, an identifier of any panel of the second electronic device, or a measurement result of a reference signal corresponding to the group of panel information.

In a possible design, the sending module is specifically configured to: send the K panel specific reference signals to the second electronic device in a plurality of time units sequentially by using the M panels; or send the K panel specific reference signals to the second electronic device in one time unit by using the M panels.

According to a fifth aspect, an embodiment of this application provides a communication apparatus. The communication apparatus may be a chip or a system on a chip in a first terminal, and includes a processor and an interface circuit. The interface circuit is configured to receive code instructions and transmit the code instructions to the processor. The processor is configured to run the code instructions, to perform the method according to any one of the first aspect or the possible designs of the first aspect.

According to a sixth aspect, an embodiment of this application provides a communication apparatus. The communication apparatus may be a chip or a system on a chip in a server, and includes a processor and an interface circuit. The interface circuit is configured to receive code instructions and transmit the code instructions to the processor. The processor is configured to run the code instructions, to perform the method according to any one of the second aspect or the possible designs of the second aspect.

According to a seventh aspect, an embodiment of this application provides a communication apparatus, including a memory and a processor, where the processor executes program instructions in the memory, to implement the method according to any one of the first aspect or the possible designs of the first aspect.

According to an eighth aspect, an embodiment of this application provides a communication apparatus, including a memory and a processor, where the processor executes program instructions in the memory, to implement the method according to any one of the second aspect or the possible designs of the second aspect.

According to a ninth aspect, an embodiment of this application provides a computer-readable storage medium, where the computer-readable storage medium is configured to store a computer program, and the computer program is used to implement the method according to any one of the first aspect or the possible designs of the first aspect.

According to a tenth aspect, an embodiment of this application provides a computer-readable storage medium, where the computer-readable storage medium is configured to store a computer program, and the computer program is used to implement the method according to any one of the second aspect or the possible designs of the second aspect.

According to an eleventh aspect, an embodiment of this application provides a communication system, including the second electronic device according to the third aspect and the corresponding feasible implementations and the first electronic device according to the fourth aspect and the corresponding feasible implementations.

It should be understood that the second aspect to the eleventh aspect of this application correspond to the technical solutions of the first aspect of this application, and beneficial effects achieved by the aspects and the corresponding feasible implementations are similar. Details are not described again.

BRIEF DESCRIPTION OF DRAWINGS

FIG. 5 is a schematic diagram of a system architecture of a communication method in a broadcast application scenario according to an embodiment of this application;

FIG. 6 is a schematic flowchart of a communication method according to an embodiment of this application;

FIG. 8 is a schematic diagram in which a second electronic device sends first indication information to a first electronic device according to an embodiment of this application;

DESCRIPTION OF EMBODIMENTS

Figure 1:
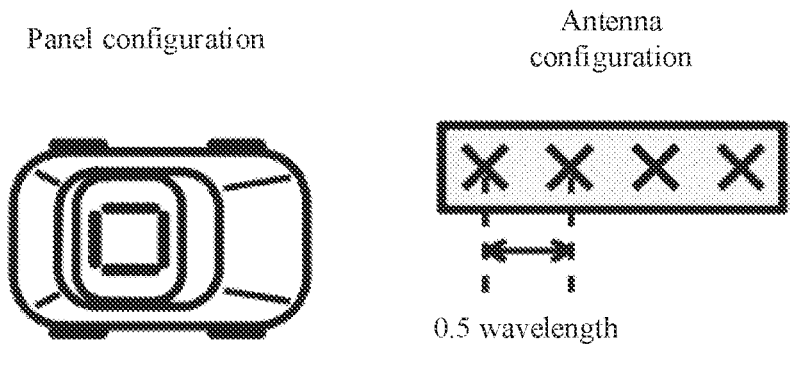
FIG. 1 is a schematic diagram of a panel configuration of a vehicle according to an embodiment of this application.

A method in embodiments of this application may be applied to a long term evolution (long term evolution, LTE) system, a $5^{th}$ generation ($5^{th}$ Generation, 5G) mobile communication system, or a future mobile communication system.

A first electronic device and a second electronic device described in embodiments of this application each may be a terminal device, a network device, a vehicle, or another electronic device, or may be a chip system, a circuit, a module, or the like in the vehicle or the another electronic device. This is not limited in this application. It should be noted that, for unified description, in embodiments provided in this application, the first electronic device and the second electronic device are used as examples for description.

In embodiments of this application, if the first electronic device is a network device, and the second electronic device is a terminal device; or if the first electronic device is a terminal device, and the second electronic device is a network device; or if the first electronic device is a network device, and the second electronic device is a network device, the first electronic device and the second electronic device may communicate based on a network system. For example, the network system may be a 5G communication system, an LTE communication system, a universal mobile telecommunications system (universal mobile telecommunications system, UMTS) terrestrial radio access network (UMTS terrestrial radio access network, UTRAN) system, a global system for mobile communication (global system for mobile communication, GSM)/enhanced data rate for GSM evolution (enhanced data rate for GSM evolution, EDGE) system radio access network (GSM EDGE radio access network, GERAN) architecture, a public land mobile network (public land mobile network, PLMN) system, a 6G system, a subsequent communication system, or the like. This is not limited in embodiments of this application.

A plurality of panels may be disposed in the terminal device. The terminal device may be an industrial robot, an industrial automation device, user equipment (user equipment, UE), an access terminal, a subscriber unit, a subscriber station, a mobile station, a remote station, a remote terminal, a mobile device, a user terminal, a terminal, a wireless terminal device, a user agent, or a user apparatus. For example, the terminal device may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a 5G network or a network after 5G, or a terminal device in a future evolved public land mobile network (public land mobile network, PLMN). This is not limited in this application.

A plurality of panels may be disposed in the network device, and the network device may be a device configured to communicate with the terminal device. For example, the network device may be a gNodeB (gNodeB, gNB) in a 5G new radio access technology (new radio access technology, NR), an evolved NodeB (evolved NodeB, eNB) in long term evolution (long term evolution, LTE), a NodeB (NodeB, NB) in a wideband code division multiple access (wideband code division multiple access, WCDMA) system, or a base transceiver station (base transceiver station, BTS) in a GSM system or a CDMA system. Alternatively, the network device may be a relay station, an access point, a vehicle-mounted device, a wearable device, a network side device in a network after 5G, a network device in a future evolved PLMN network, a road site unit (road site unit, RSU), a relay node having a base station resource allocation function, a terminal having a resource allocation function, or the like. This is not limited in this application.

The first electronic device and the second electronic device in embodiments of this application may alternatively communicate based on a vehicle to everything (vehicle to everything, V2X) system. In sidelink (Sidelink, SL) communication of the V2X system, a frequency range 2 (frequency range 2, FR2) may be applied, to implement deployment and application of frequency bands of above 6 GHz, and support functions such as vehicle platooning, extended sensors, and autonomous driving. Alternatively, in SL communication of the V2X system, the frequency range 2 may be applied to frequency bands below 6 GHz. This is not specifically limited in embodiments of this application.

For example, V2X may include four parts: vehicle-to-network (vehicle-to-network, V2N), vehicle-to-vehicle (vehicle-to-vehicle, V2V), vehicle-to-infrastructure (vehicle-to-infrastructure, V2I), and vehicle-to-pedestrian (V2P). The V2X mainly functions to connect a vehicle to a cloud server through a mobile network, to enable application functions such as navigation, entertainment, and thievery prevention that are provided by the cloud server. The V2V may be used for inter-vehicle information exchange and reminding, for example, inter-vehicle anti-collision reminding. The V2I may be used for communication between a vehicle and a road infrastructure (for example, a traffic light or a road barrier), to obtain road management information such as a time sequence of a traffic light signal. The V2P may be used by a vehicle to warn pedestrians or non-motor vehicles.

A plurality of panels may be configured in the first electronic device. The panel may also be referred to as an array panel, an antenna panel, or the like. The panel is an antenna array including several antennas, and the panel generally has directivity.

The plurality of panels may have different directions. For example, a quantity of panels may be represented by ($M_g$, $N_g$), where $M_g$ represents a quantity of panels in a vertical dimension, and $N_g$ represents a quantity of panels in a horizontal dimension. A single panel is represented by a number ($m_g$, $n_g$), where $0 \leq m_g < M_g$, and $0 \leq n_g < N_g$.

An antenna configuration of the single panel is represented by (M, N, P), where M indicates a quantity of antennas in a vertical dimension on the single panel, N indicates a quantity of antennas in a horizontal dimension on the single panel, and P indicates a polarization quantity of the antennas.

An orientation of the panel ($m_g$, $n_g$) is represented by ($\Omega_{mg,ng}$, $\Theta_{mg,ng}$), where $\Omega_{mg,ng}$ represents an azimuth angle, representing a horizontal direction angle of the panel, and $\Theta_{mg,ng}$ represents a tilt angle, representing a vertical direction angle of the panel.

It may be understood that, when the first electronic device is applied to a multiple-input multiple-output (multiple input multiple output, MIMO) system, a plurality of panels are disposed. This helps improve configuration flexibility of the MIMO system.

The first electronic device may have a plurality of panel configuration manners. For example, FIG. 1 shows a possible panel configuration manner (which may be referred to as a configuration 1) when the first electronic device is a vehicle. Four panels are installed on the top of the vehicle. The panel may include four dual-polarized antennas. Specific parameters may be as follows: (M, N, P, $M_g$, $N_g$)=(1, 4, 2, 1, 4), $\Omega_{0,1}=\Omega_{0,0}+90°$, $\Omega_{0,2}=\Omega_{0,0}+180°$, $\Omega_{0,3}=\Omega_{0,0}+270°$, and $\Theta_{0,0}=\Theta_{0,1}=\Theta_{0,2}=\Theta_{0,3}=90°$. The vehicle may send a signal by using a wide beam or receive a signal by using a wide-angle-range spatial filter in four horizontal directions around.

Figure 2:
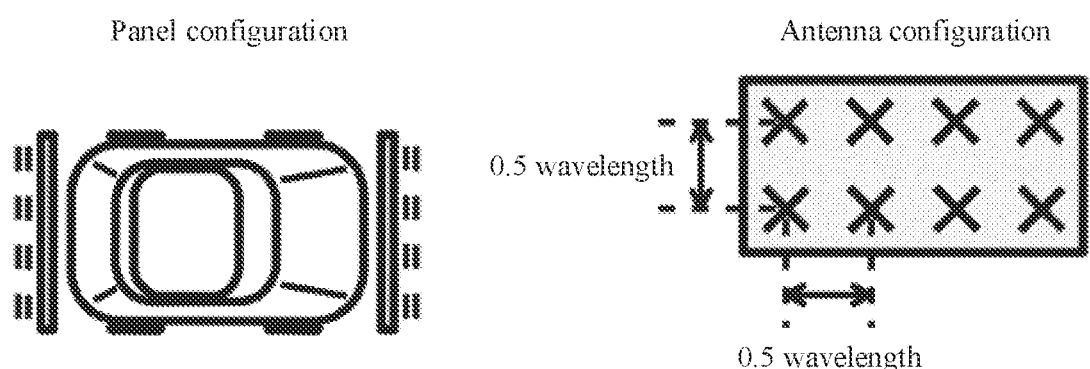
FIG. 2 is a schematic diagram of a panel configuration of a vehicle according to an embodiment of this application.

For example, FIG. 2 shows another possible panel configuration manner (which may be referred to as a configuration 2) when the first electronic device is a vehicle. Two panels are installed on front and rear bumpers of the vehicle respectively. The panel may include eight dual-polarized antennas. Specific parameters may be as follows: (M, N, P, $M_g$, $N_g$)=(2, 4, 2, 1, 2), $\Omega_{0,0}=0°$, $\omega_{0,1}=180°$, and $\Theta_{0,0}=\Theta_{0,1}=90°$. The vehicle may send a signal by using a wide beam or receive a signal by using a wide-angle-range spatial filter in both forward and backward horizontal directions.

In a specific application, because the antennas on the panel are directional antennas, and the panel has directivity in both a vertical dimension and a horizontal dimension, if the vehicle selects an inappropriate panel when sending a signal, it is possible that the sent signal does not point to a receiver, or a spatial filter of the receiver may not cover the signal sent by the vehicle, or the signal sent by the vehicle may suffer an extra path loss or penetration loss. Consequently, the receiver and a transmitter are not matched, and a channel gain and a signal-to-noise ratio are reduced.

For a specific panel configuration of the second electronic device, refer to descriptions of the panel configuration of the first electronic device. The panel configuration of the second electronic device may be different from that of the first electronic device, or may be the same as that of the first electronic device. Details are not described herein again.

It may be understood that, because the first electronic device and the second electronic device each may include 32 single-polarized antennas, if the antenna is used as an object to be selected when the first electronic device communicates with the second electronic device, for each antenna port of the first electronic device or each antenna port of the second electronic device, a time domain resource needs to be allocated to send a sidelink sounding reference signal (Sidelink Sounding Reference Signal, SL-SRS), and resource overheads are large. In addition, link quality of different antenna ports is mainly affected by small-scale fading of a channel, and a rapid change of the small-scale fading requires high-frequency channel measurement to implement antenna selection. However, when both the first electronic device and the second electronic device are vehicles, link quality of a V2X SL during communication between different panels on an FR2 frequency band is mainly affected by a relative location between vehicles and existence of an obstacle between vehicles. Because the relative location between the vehicles and the obstacle between the vehicles change slowly, low-frequency channel measurement may be required. Therefore, the manner in which the antenna is used as the object to be selected is not applicable to a scenario of communication between the first electronic device and the second electronic device.

In embodiments of this application, a multi-panel electronic device is used as a research object, and a communication method in which a panel of the first electronic device and a panel of the second electronic device are used as objects to be selected is proposed. When the first electronic device or the second electronic device performs communication, a process such as signal quality measurement, sending panel selection, or receiving panel selection may be performed by using a panel as a basic unit, and a reference signal resource does not need to be allocated to each antenna port, so that resource overheads are small.

When the panel is used as the object to be selected, related technical points may include:

Panel determination (panel determination): The panel determination is a process in which the transmitter or the receiver determines a sending panel or a receiving panel that should be selected.

Panel measurement (panel measurement): The panel measurement is a process in which the receiver measures a reference signal that is sent by the transmitter and that is related to panel selection.

Panel reporting (panel measurement): The panel reporting is a process in which the receiver reports a panel measurement result to the transmitter.

Panel sweeping (panel sweeping): The panel sweeping is a process in which the transmitter sequentially selects a panel for sending and the receiver sequentially selects a panel for receiving in a specific sequence.

Panel correspondence property: The receiver is capable of determining a sending panel of the receiver based on the selected receiving panel, and the transmitter is capable of determining a receiving panel of the transmitter based on the selected sending panel. For example, in the V2X SL, the panel correspondence illustratively means that a receiving panel of a destination vehicle UE may be used as a sending panel to send information (for example, reporting information) to a source vehicle UE, and a sending panel of the source vehicle UE may be used as a receiving panel to receive the information sent by the destination vehicle UE. The panel correspondence eliminates a process in which a receiver repeatedly selects a panel when sending information to a transmitter.

The foregoing technical points are described in detail in the following embodiments. Details are not described herein again.

It should be noted that although processes of beam determination, beam measurement, beam reporting, and beam sweeping may exist in beam management, the beam management is mainly oriented to a massive MIMO system. In current V2X SL communication, a quantity of antennas on a single panel of a vehicle UE is limited, and a narrow beam with specific directivity cannot be formed. Therefore, the beam management cannot be apparently applied to the panel-based communication method in embodiments of this application.

The method in embodiments of this application is applicable to unicast, groupcast, and broadcast application scenarios, and the like. An example in which both the first electronic device and the second electronic device are vehicles is described in the following embodiments.

Figure 3:
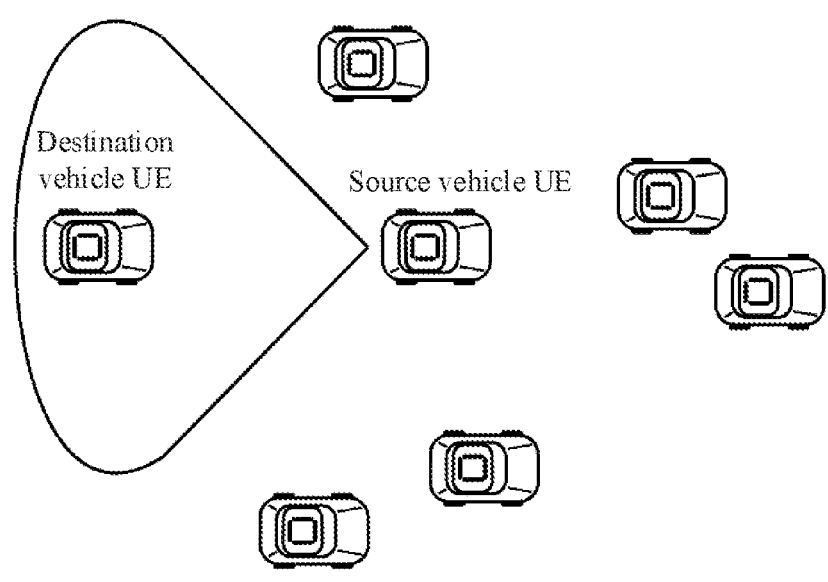
FIG. 3 is a schematic diagram of a system architecture of a communication method in a unicast application scenario according to an embodiment of this application.
Figure 4:
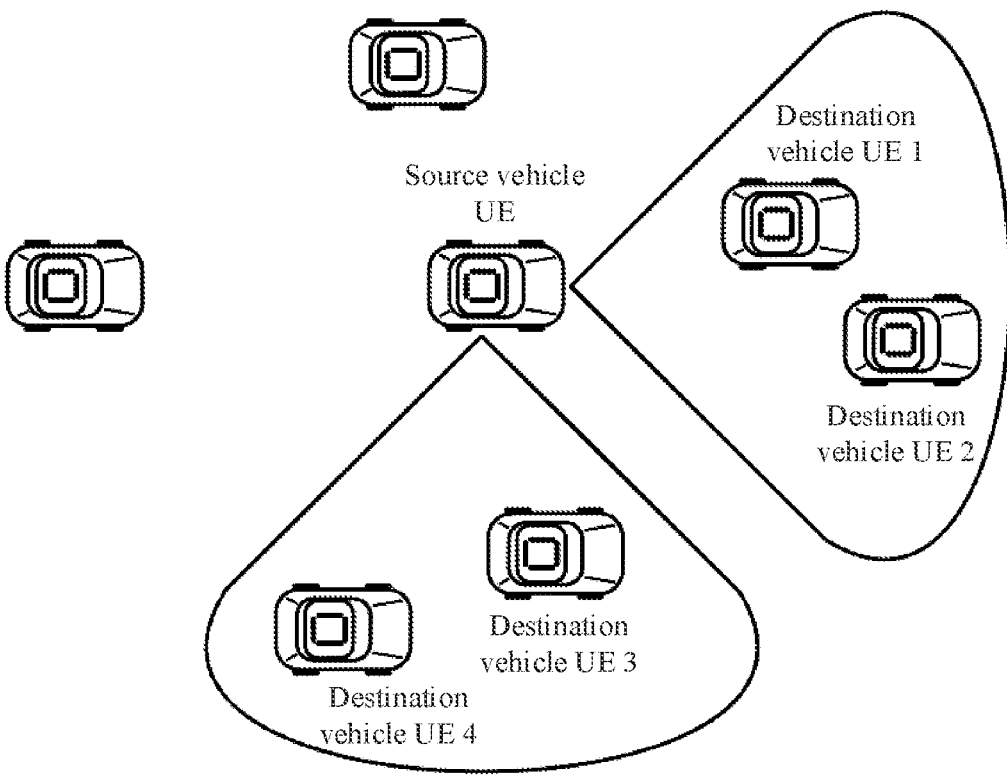
FIG. 4 is a schematic diagram of a system architecture of a communication method in a groupcast application scenario according to an embodiment of this application.

For example, FIG. 3 to FIG. 5 are schematic diagrams of three possible system architectures according to an embodiment of this application.

FIG. 3 is a schematic diagram of a system architecture of a method in a unicast application scenario according to an embodiment of this application. As shown in FIG. 3, in the unicast scenario, there may be one source vehicle UE (Source Vehicle UE) and one destination vehicle UE (Destination Vehicle UE). The source vehicle UE may serve as an information sending entity in a V2X SL, and the destination vehicle UE may serve as an information receiving entity in the V2X SL. The destination vehicle UE may further measure quality of a signal received from the source vehicle UE, and may send a result of the measurement to the source vehicle UE.

The source vehicle UE may send a beam (beam) to the destination vehicle UE. The beam may be sent in a directional radiation manner by a same antenna port on a panel of the source vehicle UE. The beam may be received in a directional spatial filtering manner by a same antenna port on a receiving panel of the destination vehicle UE. In FIG. 3, only the sent beam is marked, and is represented in a petal shape.

FIG. 4 is a schematic diagram of a system architecture of a method in a groupcast application scenario according to an embodiment of this application. As shown in FIG. 4, in the groupcast scenario, there may be one source vehicle UE and one group of destination vehicle UEs.

The source vehicle UE may send a beam to the group of destination vehicle UEs. A quantity of the destination vehicle UEs may be set based on an actual application scenario. This is not specifically limited in this embodiment of this application.

FIG. 5 is a schematic diagram of a system architecture of a method in a broadcast application scenario according to an embodiment of this application. As shown in FIG. 5, in the broadcast scenario, there may be one source vehicle UE, and destination vehicle UEs are not distinguished.

The source vehicle UE may broadcast a signal by using a plurality of panels, and the destination vehicle UE may be a vehicle that can receive the signal broadcast by the source vehicle UE.

An example in which the first electronic device is a source vehicle UE and the second electronic device is a destination vehicle UE is described in the following specific embodiments to detail the technical solutions of this application and how the technical solutions of this application resolve the foregoing technical problems. The following several specific embodiments may be implemented independently or combined with each other, and same or similar concepts or processes may not be repeatedly described in some embodiments.

FIG. 6 is a schematic flowchart of a communication method according to an embodiment of this application. As shown in FIG. 6, the method includes:

S601: A second electronic device receives K panel specific reference signals from a first electronic device by using N panels, where the panel specific reference signal is related to an identifier of a panel that is of the first electronic device and that sends the panel specific reference signal, and N and K are each an integer greater than or equal to 2.

S602: The second electronic device measures signal quality of the K panel specific reference signals.

In this embodiment of this application, the first electronic device may send the K panel specific reference signals to the second electronic device by using M panels. Adaptively, the second electronic device may receive the K panel specific reference signals from the first electronic device by using the N panels.

The panel specific reference signal in this embodiment of this application is a signal related to the identifier of the panel that sends the panel specific reference signal. A specific form of the panel specific reference signal may be a pseudo-random sequence, for example, a gold sequence. The identifier of the panel may be set based on an actual application scenario. This is not specifically limited in this embodiment of this application.

After receiving the K panel specific reference signals of the first electronic device by using the N panels, the second electronic device may measure the signal quality of the received K panel specific reference signals. For example, a reference signal received power (Reference Signal Received Power, RSRP) of each panel specific reference signal may be measured.

Optionally, a measurement result obtained by measuring the signal quality of the K panel specific reference signals may be used for determining, from the N panels, a first panel for receiving data sent by the first electronic device. The first panel may also be used by the second electronic device to send data to the first electronic device. That is, in this embodiment of this application, instead of using an antenna as a basic selection unit in the conventional technology, a panel that includes an antenna array including several antennas is used as a basic selection unit in communication, so that in multi-antenna communication, there is no need to allocate a reference signal resource to each antenna port, and therefore resource overheads are small.

Optionally, the second electronic device may send first indication information to the first electronic device by using the first panel, where the first indication information is indication information related to one or more panels of the first electronic device.

In this embodiment of this application, after measuring the signal quality of the K panel specific reference signals to obtain the measurement result, the second electronic device may learn that signal quality is good when one or more panels of the first electronic device send the panel specific reference signals. Therefore, the second electronic device may send, to the first electronic device by using the first panel, an identifier of the one or more panels that are of the first electronic device and that provide the good signal quality when sending the panel specific reference signals, or send the measurement result to the first electronic device. In this way, when the first electronic device needs to send data to the second electronic device, the first electronic device may determine, based on the first indication information, a panel for sending the data to the second electronic device. In this process, the first electronic device does not need to measure quality of signals between each panel of the first electronic device and each panel of the second electronic device. This reduces consumption of computing resources of the first electronic device.

Figure 7:
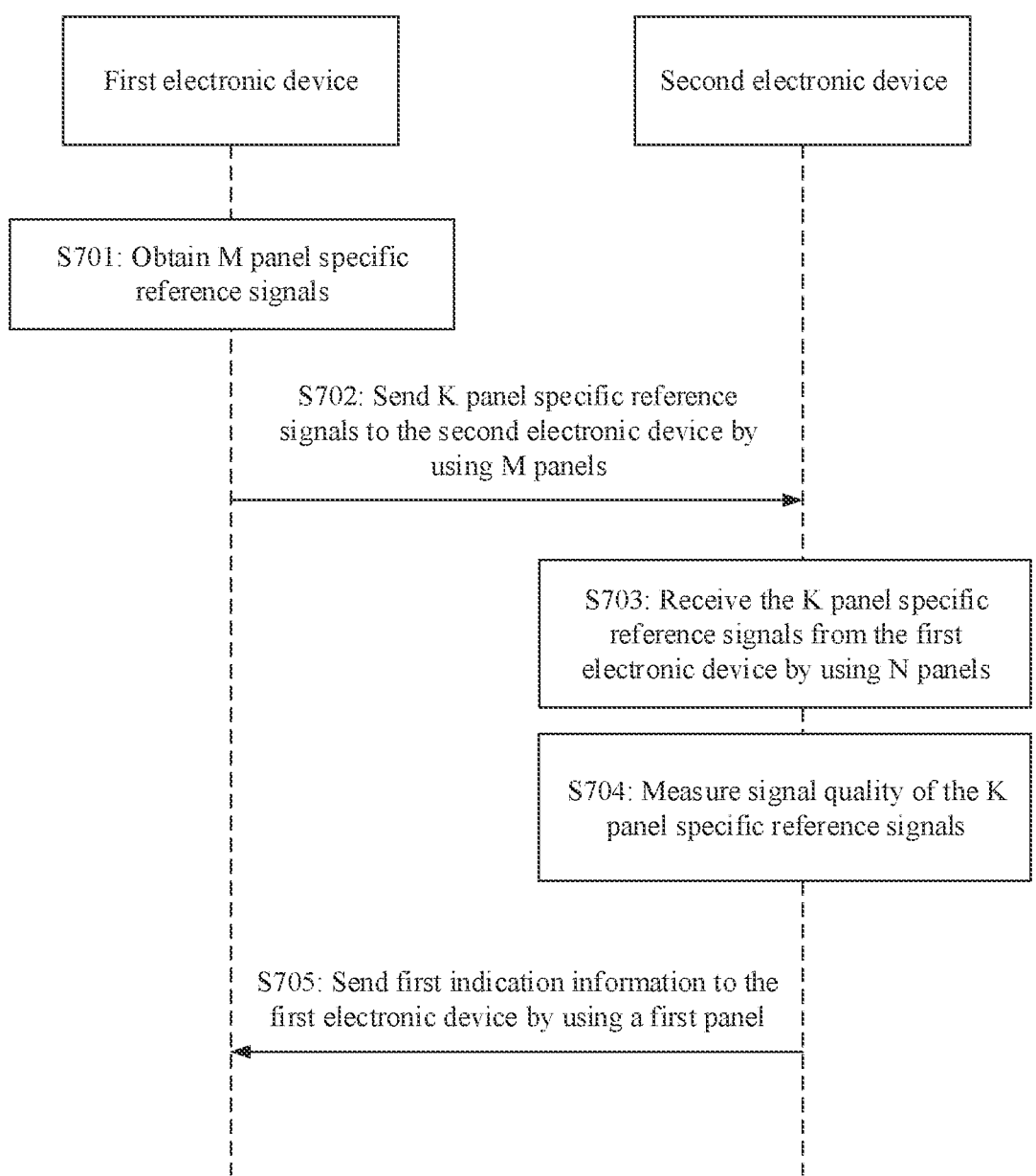
FIG. 7 is a schematic signaling flowchart of a communication method in a unicast scenario according to an embodiment of this application.

For example, FIG. 7 is a schematic signaling flowchart of a communication method in a unicast scenario according to an embodiment of this application.

S701: A first electronic device obtains M panel specific reference signals, where the panel specific reference signal is related to an identifier of a panel of the first electronic device, and M is an integer greater than or equal to 2.

In this embodiment of this application, the first electronic device may include M panels. Each panel may correspond to one panel specific reference signal, and the panel specific reference signal is a signal related to the identifier of any panel of the first electronic device, so that communication with the panel as a selection unit can be implemented based on the panel specific reference signal.

The first electronic device may generate the M panel specific reference signals based on the identifiers of the M panels respectively.

The first electronic device may alternatively obtain the M panel specific reference signals according to specifications of a protocol.

The first electronic device may alternatively obtain the M panel specific reference signals from a network device or another device. This is not specifically limited in this embodiment of this application.

In this embodiment of this application, the identifier of the panel may be configured according to a protocol or an actual application scenario. For example, the identifier of the panel may be a number. For example, in the foregoing panel configuration manner 1, a panel that faces the same direction as a vehicle may be numbered 0, and the other three panels are respectively numbered 1, 2, and 3 in a clockwise direction or a counter-clockwise direction, or the four panels in the vehicle may be randomly numbered 0, 1, 2, and 3, or the four panels in the vehicle may be randomly numbered. This is not limited in this embodiment of this application. In the foregoing panel configuration manner 2, two panels in the vehicle may be numbered differently from those in the panel configuration manner 1, for example, numbered 4 and 5, so that a specific panel can be identified based on a number of the panel.

Alternatively, an identifier $i_{panel\_ID}$ of the panel may be calculated from the number and an identifier in the panel configuration manner of the first electronic device. For example, $n_{config}$ represents a panel configuration of the panel. A feasible representation manner is as follows: The configuration 1 corresponds to $n_{config}=0$, and the configuration 2 corresponds to $n_{config}=1$. Each panel is numbered a horizontal panel number $n_g$ of a universal panel number ($m_g$, $n_g$). In a feasible manner, in the configuration 1, the panel that faces the same direction as the vehicle is numbered $n_g=0$, and the other panels are respectively numbered $n_g=1$, $n_g=2$, and $n_g=3$ in the clockwise direction. In the configuration 2, a panel that faces the same direction as the vehicle is numbered $n_g=0$, and the other panel is numbered $n_g=1$. The identifier $i_{panel\_ID}$ of the panel is calculated from $n_{config}$ and $n_g$. For the plurality of panels in the configuration 1 and the configuration 2, a feasible panel identification method is $i_{panel\_ID}=2^2 n_{config}+n_g$. With reference to the foregoing $n_{config}$ and $n_g$ representation methods, the panels in the configuration 1 are identified as $i_{panel\_ID}=0$, 1, 2, 3, and the two panels in the configuration 2 are identified as $i_{panel\_ID}=4$, 5.

It may be understood that the identifier of the panel may alternatively be represented in another manner based on an actual application scenario. This is not specifically limited in this embodiment of this application.

The panel specific reference signal in this embodiment of this application may include a plurality of forms. In this embodiment of this application, a first panel specific reference signal is described as an example.

In a possible implementation, a pseudo-random sequence initial value of the first panel specific reference signal is related to an identifier of a panel that sends the panel specific reference signal.

The first panel specific reference signal may be defined as a panel specific reference signal (Panel Specific Reference Signal, PS-RS), or may be defined as a signal with another name. For example, the first panel specific reference signal is the PS-RS. The PS-RS is a reference signal for representing a signal source panel, and includes identification information of the panel. A generation process of the PS-RS is affected by a configuration and a number of the corresponding panel.

Optionally, a pseudo-random sequence initial value $C1_{init}$ of the PS-RS satisfies an equation:

$$C1_{init}=2^{11}(i_{panel\_ID}+1)+2^6(i_{panel\_ID}+1).$$

S702: The first electronic device sends K panel specific reference signals to a second electronic device by using the M panels, where the first electronic device sends one or more panel specific reference signals on any one of the M panels, and K is an integer greater than or equal to M.

S703: The second electronic device receives the K panel specific reference signals from the first electronic device by using N panels.

In this embodiment of this application, each panel of the first electronic device may send a panel specific reference signal corresponding to the panel, and each panel may send one or more panel specific reference signals corresponding to the panel. Therefore, K may be an integer greater than or equal to M.

In this embodiment of this application, for example, the panel specific reference signal is the PS-RS. The PS-RS may be mapped to one time unit (for example, a slot) in a manner of performing frequency division multiplexing, time division multiplexing, or both on a physical sidelink control channel (Physical Sidelink Control Channel, PSCCH) or a physical sidelink shared channel (Physical Sidelink Shared Channel, PSSCH). When the panel of the first electronic device sends the PS-RS, sidelink control information (Sidelink Control Information, SCI) may carry existence indication information of the PS-RS and/or a resource mapping mode of the PS-RS. Optionally, in the unicast scenario, the SCI may further carry information for indicating a time-frequency resource that is used by the second electronic device to subsequently report a measurement result.

In an optional implementation, the first electronic device sends the K panel specific reference signals to the second electronic device in a plurality of time units sequentially by using the M panels. For example, the first electronic device may sequentially select, in a specific time sequence, a panel to send a time unit including a PS-RS. Adaptively, the second electronic device may receive, in a plurality of time units by using the N panels, the K panel specific reference signals from the first electronic device. Because the panels of the first electronic device send the panel specific reference signals in a time-division manner, interference between the panel specific reference signals sent by the panels can be avoided, so that the second electronic device can subsequently obtain the relatively accurate measurement result when measuring signal quality.

In another optional implementation, the first electronic device sends the K panel specific reference signals to the second electronic device in one time unit by using the M panels. For example, the first electronic device may send the K panel specific reference signals to the second electronic device simultaneously in one time unit by using the M panels. Adaptively, the second electronic device may receive the K panel specific reference signals from the first electronic device in one time unit by using the N panels. Because the M panels of the first electronic device simultaneously send the panel specific reference signals to the second electronic device, consumption of time resources for sending the panel specific reference signals can be reduced.

S704: The second electronic device measures the signal quality of the K panel specific reference signals.

In this embodiment of this application, the second electronic device may measure an RSRP of the received K panel specific reference signals. Therefore, an optimal receiving panel may be determined based on the measured RSRP of the K panel specific reference signals. The optimal receiving panel may alternatively be a sending panel used when the second electronic device sends information to the first electronic device. For example, the second electronic device obtains eight RSRPs in a sweeping process of the sending panel: $P_{4,0}$, $P_{5,0}$, $P_{4,1}$, $P_{5,1}$, $P_{4,2}$, $P_{5,2}$, $P_{4,3}$, and $P_{5,3}$. Herein, the largest value is $P_{5,0}$. The second electronic device may determine a panel 5 as the optimal receiving panel based on the largest value.

Optionally, the second electronic device may perform blind detection to obtain a panel identifier of a panel that is of the first electronic device and that is corresponding to the panel specific reference signals, and then determine a start point and an end point of sweeping time of the panel of the first electronic device based on the panel identifier.

For example, it is assumed that $P_{j_{panel\_ID}, i_{panel\_ID}}$ represents an RSRP that is measured on a panel $j_{panel\_ID}$ of the second electronic device and that is of a PS-RS sent by a panel $i_{panel\_ID}$ of the first electronic device. In the measurement process, after performing blind detection to obtain $i_{panel\_ID}$ information carried by a PS-RS, the second electronic device obtains the start point and the end point of the sweeping time of the panel of the first electronic device and a current sweeping progress, to determine a quantity of swept sending panels and a quantity of sending panels to be swept. For example, the panels of the first electronic device use the configuration 1 and the panels of the second electronic device use the configuration 2. After performing blind detection on a PS-RS received by a panel 5 to obtain $i_{panel\_ID}=0$, the second electronic device determines that a current sending panel has been swept, and other three sending panels are to be swept. Therefore, the second electronic device may reserve a resource for receiving the panel specific reference signals of the first electronic device.

S705: The second electronic device sends first indication information to the first electronic device by using a first panel, where the first panel is related to the signal quality of the K panel specific reference signals, and the first indication information is indication information related to one or more panels of the first electronic device.

In this embodiment of this application, the second electronic device may obtain, from the first electronic device, a time-frequency resource indication that is in the SCI and that is used for sending the first indication information. The first indication information may be set in the SCI, and sent to the first electronic device in a corresponding time domain.

In this embodiment of this application, the second electronic device may use, as the first panel, a panel that receives a reference signal with a largest RSRP, to send the first indication information to the first electronic device. The first indication information may include one or more measurement results. Alternatively, a panel that receives a reference signal with a second largest RSRP or a third largest RSRP may be used as the first panel, to send the first indication information and the like to the first electronic device. This is not specifically limited in this embodiment of this application.

The first indication information may be related to one panel of the first electronic device. For example, the first indication information may include an identifier of a panel corresponding to a largest RSRP in the first electronic device, and/or the largest RSRP. Because the first indication information includes relatively little content, consumption of signaling resources can be reduced. After receiving the first indication information, the first electronic device may directly use, as an optimal panel for communicating with the second electronic device, a panel corresponding to the panel identifier included in the first indication information.

The first indication information may alternatively be related to a plurality of panels of the first electronic device. For example, the first information may include identifiers of panels that are of the first electronic device and that are corresponding to q large RSRPs, and/or the q RSRPs, where q may be a positive integer greater than or equal to 2. In this embodiment of this application, the largest RSRP reflects a current optimal communication panel of the first electronic device and the second electronic device. As locations of the first electronic device and the second electronic device change, a link corresponding to the largest RSRP may fail. Therefore, the first indication information includes a plurality of panel identifiers, and the first electronic device may select an adaptive panel from the plurality of panels according to a requirement, to ensure robustness of communication.

In a possible implementation, the first indication information includes one or more groups of panel information, and each group of panel information includes at least one of the following: an identifier of any panel of the first electronic device, an identifier of any panel of the second electronic device, or a measurement result of a reference signal corresponding to the group of panel information.

For example, Table 1 shows possible content included in the first indication information. An identifier of a sending panel may be an identifier of a panel of the first electronic device, and an identifier of a receiving panel may be an identifier of a panel of the second electronic device.

TABLE 1

| First indication information | | |
| --- | --- | --- |
| Identifier of a sending panel | Identifier of a receiving panel | RSRP |
| 1 | 3 | $P_{3,1}$ |
| 0 | 2 | $P_{2,0}$ |

In another possible implementation, the first indication information includes one or more pieces of panel information, and each piece of panel information includes at least one of the following: an identifier of any panel of the first electronic device and a measurement result of a reference signal corresponding to the any panel.

For example, Table 2 shows possible content included in the first indication information. An identifier of a sending panel may be an identifier of a panel of the first electronic device.

TABLE 2

| First indication information | |
| --- | --- |
| Identifier of a sending panel | RSRP |
| 1 | $P_{3,1}$ |
| 0 | $P_{2,0}$ |

A difference between Table 2 and Table 1 lies in that Table 2 does not include panel identifiers of the second electronic device, so that consumption of signaling resources can be reduced in the embodiment corresponding to Table 2. However. Table 1 includes the panel identifiers of the second electronic device, so that the first electronic device can learn a situation of the second electronic device.

For example, FIG. 8 is a beneficial effect schematic diagram in which a destination vehicle UE reports a plurality of groups of RSRPs and identifiers of corresponding sending and receiving panels to a source vehicle UE.

As shown in FIG. 8, both the source vehicle UE and the destination vehicle UE use the configuration 1. To be specific, four panels are installed on the top of each vehicle, and both vehicles move eastward at speeds of v and 2v respectively. At a moment $t_0$, the destination vehicle UE reports RSRPs of two panel selection solutions, and the largest RSRP is $P_{3,1}$. Therefore, at the moment to, the source vehicle UE selects 1 as a sending panel, and the destination vehicle UE selects 3 as an optimal receiving panel. A V2X SL is marked by a connection line between the sending panel and the optimal receiving panel. Because the destination vehicle UE is high in speed, the sending panel 1 gradually cannot cover the receiving panel 3, and therefore $P_{3,1}$ gradually decreases. On the contrary. $P_{2,0}$ corresponding to the other panel selection solution gradually increases. The source vehicle UE predicts, based on a change of the RSRP, that the sending panel of the source vehicle UE is to be switched to 0, and the receiving panel of the destination vehicle UE is to be switched to 2. At a moment $t_1$, the sending panel and the receiving panel are switched for the link, and the largest RSRP in panel reporting changes to $P_{2,0}$, which is consistent with prediction. In addition, because an optimal panel selection solution and a suboptimal panel selection solution are provided in the panel reporting, when the link fails in the optimal panel selection solution, the source vehicle UE is capable of quickly attempting to restore link communication by using the suboptimal panel selection solution.

Figure 9:
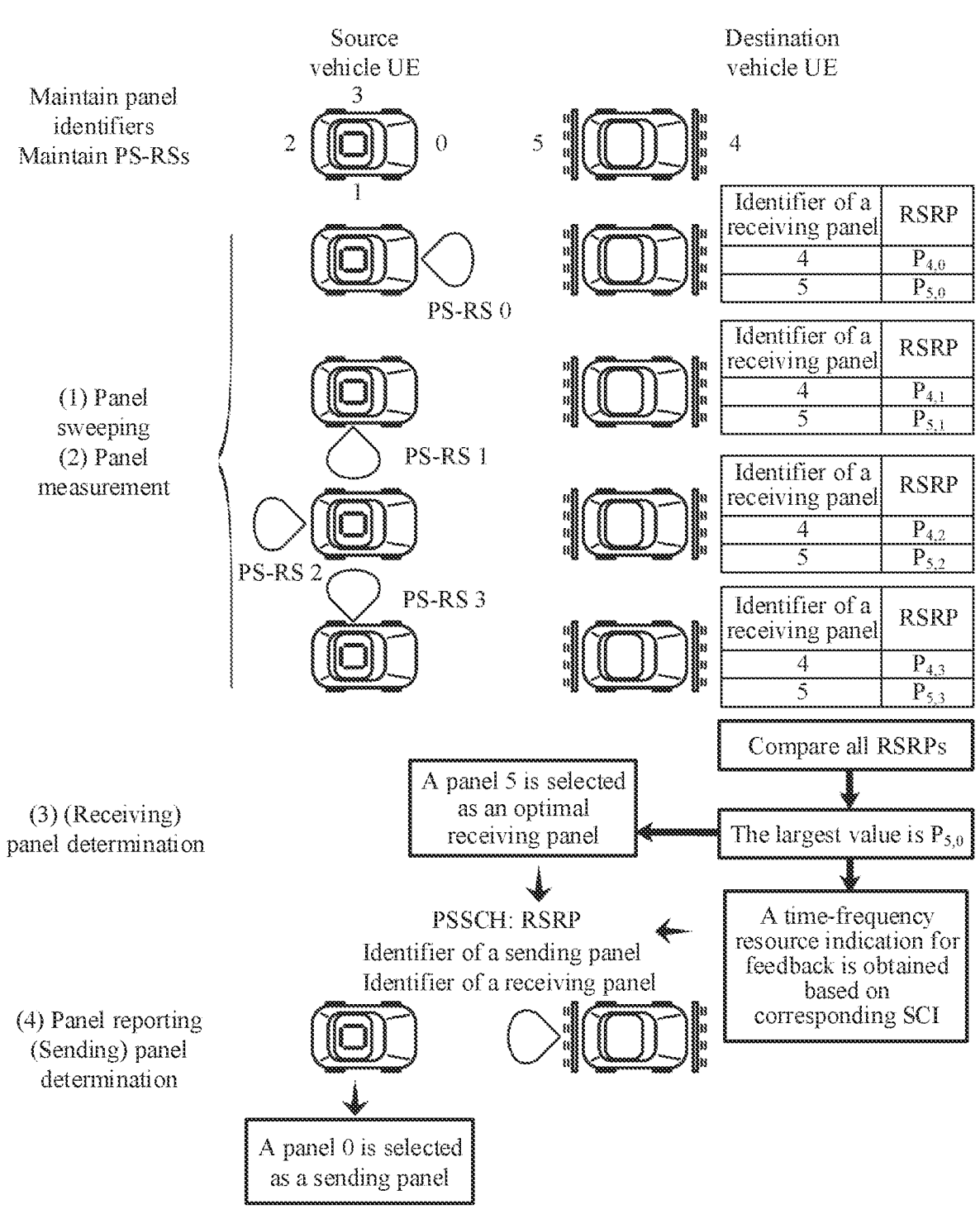
FIG. 9 is a schematic diagram of a specific scenario of a communication method in a unicast application scenario according to an embodiment of this application.

For example, FIG. 9 is a schematic diagram of a unicast application scenario in which a first electronic device is a source vehicle UE and a second electronic device is a destination vehicle UE.

The source vehicle UE may maintain panel identifiers (which may also be referred to as identifiers of panels) and PS-RSs (including, for example, a PS-RS 0, a PS-RS 1, a PS-RS 2, and a PS-RS 3), perform panel sweeping, and sequentially send the PS-RS 0, the PS-RS 1, the PS-RS 2, and the PS-RS 3 to the destination vehicle UE. The destination vehicle UE may measure RSRPs of the received PS-RSs while receiving the PS-RSs, or may measure the RSRPs of the PS-RSs after the PS-RS 0, the PS-RS 1, the PS-RS 2, and the PS-RS 3 are all received. This is not limited in this embodiment of this application.

The destination vehicle UE may use a panel corresponding to a largest RSRP as an optimal panel, and send, to the source vehicle UE by using the optimal panel, an identifier of a sending panel and an identifier of a receiving panel that are corresponding to the largest RSRP, or may send, to the source vehicle UE, identifiers of sending panels and identifiers of receiving panels that are corresponding to a plurality of large RSRPs.

The source vehicle UE may determine an optimal panel of the source vehicle UE based on information sent by the destination vehicle UE, and then send or receive data to or from the destination vehicle UE by using the optimal panel.

Figure 10:
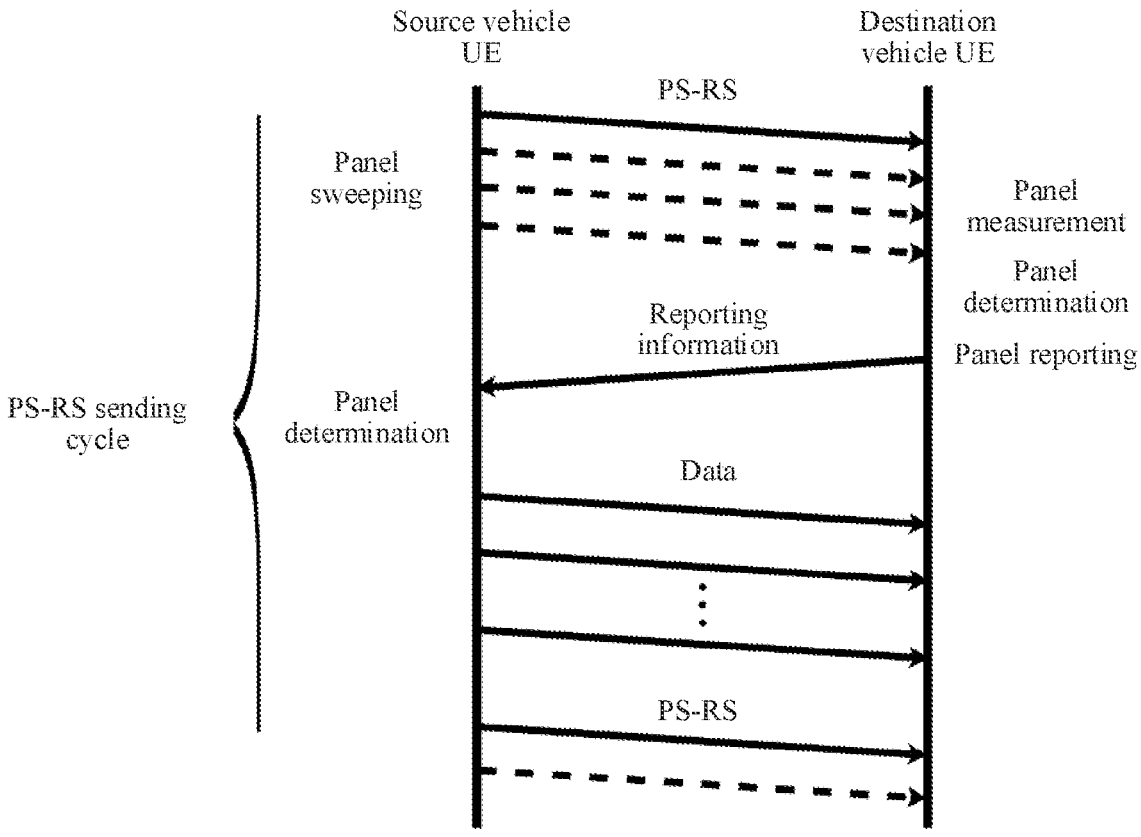
FIG. 10 is a schematic diagram of a time sequence of communication between a source vehicle and a destination vehicle according to an embodiment of this application.

For example, FIG. 10 is a schematic diagram of a time sequence of communication between a source vehicle UE and a destination vehicle UE according to an embodiment of this application. In a panel sweeping step, the source vehicle UE may select different panels in a plurality of slots to send associated reference signals. The source vehicle UE requires four slots in the panel configuration 1 and requires two slots in the panel configuration 2. In addition, the destination vehicle UE performs panel measurement and performs receiving panel determination after the measurement ends. Then, the destination vehicle UE sends reporting information to the source vehicle UE in one slot, and the source vehicle UE performs sending panel determination based on the reporting information. After a sending panel is determined, the source vehicle UE sends data information to the destination vehicle UE by using the panel through a PSSCH. A PS-RS sending cycle in the figure refers to an interval between two times of panel sweeping, and represents a periodicity of performing panel selection. The panel selection is periodically performed to update a result of the panel selection. In addition, the panel selection may alternatively be performed aperiodically, and a panel selection process is re-triggered when a link fails.

In a possible implementation, the panel specific reference signal corresponding to FIG. 7 may be a second panel specific reference signal. The second panel specific reference signal is different from the first panel specific reference signal.

In a possible implementation, the second panel specific reference signal is related to at least one of the following: an identifier of a panel that sends the panel specific reference signal, or a pseudo-random sequence initial value of a physical sidelink control channel demodulation reference signal (Physical Sidelink Control Channel Demodulation Reference Signal, PSCCH DMRS).

In this embodiment of this application, the second panel signal may be defined as a PSCCH DMRS, but the PSCCH DMRS has a different meaning from a PSCCH DMRS in a historical protocol. The second panel signal may alternatively be defined as another name. This is not specifically limited in this embodiment of this application.

Optionally, a pseudo-random sequence initial value $C2_{init}$ of the second panel specific reference signal satisfies an equation:

$$C2_{init} = (2^1 C2_{init,0} + i_{panel\_ID}) \bmod 2^{31}.$$

Herein, $C2_{init,0}$ is an original pseudo-random sequence initial value of the PSCCH DMRS in the historical protocol. The original pseudo-random sequence initial value may also be understood as the pseudo-random sequence initial value of the PSCCH DMRS existing when panel selection is not considered, and 1 is related to a total quantity of panel identifiers defined in a network. The total quantity of the panel identifiers defined in the network may be a total quantity of all panel identifiers in the panel configuration that may exist in the network. For example, the total quantity of the panel identifiers in the foregoing embodiment is 6, and the value of 1 may be 3.

Because a DMRS may be generated based on a pseudo-random sequence, in this embodiment, under a condition that a function of the DMRS and accuracy of blind detection are not affected, a pseudo-random sequence initial value $C2_{init}$ of the DMRS is changed to carry a panel identifier. In addition, because the PSCCH DMRS is endowed with a new function, a new reference signal resource does not need to be allocated, so that consumption of signaling resources can be reduced.

In a possible implementation, the panel specific reference signal corresponding to FIG. 7 may be a third panel specific reference signal. The third panel specific reference signal is different from the first panel specific reference signal.

In a possible implementation, the third panel specific reference signal is related to at least one of the following: the identifier of the panel that sends the panel specific reference signal, or a pseudo-random sequence initial value of a physical sidelink broadcast channel demodulation reference signal (Physical Sidelink Broadcast Channel Demodulation Reference Signal, PSBCH DMRS).

In this embodiment of this application, the third panel signal may be defined as a PSBCH DMRS, but the PSBCH DMRS has a different meaning from a PSBCH DMRS in the historical protocol. The third panel signal may alternatively be defined as another name. This is not specifically limited in this embodiment of this application.

Optionally, a pseudo-random sequence initial value $C3_{init}$ of the third panel specific reference signal satisfies an equation:

$$C3_{init} = (2^1 C3_{init,0} + i_{panel\_ID}) \bmod 2^{31}.$$

Herein, $C3_{init,0}$ is an original pseudo-random sequence initial value of the PSBCH DMRS in the historical protocol. The original pseudo-random sequence initial value may also be understood as the pseudo-random sequence initial value of the PSBCH DMRS existing when panel selection is not considered, and 1 is related to the total quantity of the panel identifiers defined in the network. The total quantity of the panel identifiers defined in the network may be the total quantity of all the panel identifiers in the panel configuration that may exist in the network. For example, the total quantity of the panel identifiers in the foregoing embodiment is 6, and the value of 1 may be 3.

In this embodiment of this application, the first electronic device may sequentially select a panel to send a sidelink synchronization signal block (Sidelink Synchronization Signal Block, SL-SSB), and a PSBCH in the SL-SSB carries the third panel specific reference signal. Because the PSBCH DMRS is endowed with a new function, anew reference signal resource does not need to be allocated, so that consumption of signaling resources can be reduced.

In a possible implementation, the panel specific reference signal corresponding to FIG. 7 may be a fourth panel specific reference signal. The fourth panel specific reference signal is different from the first panel specific reference signal.

In a possible implementation, the fourth panel specific reference signal is related to at least one of the following: the identifier of the panel that sends the panel specific reference signal, or a pseudo-random sequence initial value of a sidelink channel state information reference signal (Sidelink Channel State Information Reference Signal, SL-CSI-RS).

In this embodiment of this application, the fourth panel signal may be defined as an SL-CSI-RS, but the SL-CSI-RS has a different meaning from an SL-CSI-RS in the historical protocol. The fourth panel signal may alternatively be defined as another name. This is not specifically limited in this embodiment of this application.

Optionally, a pseudo-random sequence initial value $C4_{init}$ of the fourth panel specific reference signal satisfies an equation:

$$C4_{init} = (2^1 C4_{init,0} + i_{panel\_ID}) \bmod 2^{31}.$$

Herein, $C4_{init,0}$ is an original pseudo-random sequence initial value of the SL-CSI-RS in the historical protocol. The original pseudo-random sequence initial value may also be understood as the pseudo-random sequence initial value of the SL-CSI-RS existing when panel selection is not considered, and 1 is related to the total quantity of the panel identifiers defined in the network. The total quantity of the panel identifiers defined in the network may be the total quantity of all the panel identifiers in the panel configuration that may exist in the network. For example, the total quantity of the panel identifiers in the foregoing embodiment is 6, and the value of 1 may be 3.

In this embodiment of this application, when sending first indication information to the first electronic device, the second electronic device may send, to the first electronic device on a specific time-frequency resource for feeding back the SL-CSI-RS, PSSCH reporting information that carries the first indication information.

In this embodiment of this application, because the SL-CSI-RS is endowed with a new function, a new reference signal resource does not need to be allocated, so that consumption of signaling resources can be reduced.

It should be noted that $C1_{init}$, $C2_{init}$, $C3_{init}$, and $C4_{init}$ in this embodiment of this application are defined to distinguish among the pseudo-random sequence initial values of the first reference signal to the fourth reference signal, and may be unified as $C_{init}$ in an application. This is not specifically limited in this embodiment of this application.

For example, when the communication method in this embodiment of this application is applied to a groupcast scenario, a difference from the embodiment corresponding to the unicast scenario is that when the first electronic device sends the K panel specific reference signals by using the M panels, each second electronic device in a group of second electronic devices (which may include a plurality of second electronic devices) separately receives the K panel specific reference signals from the first electronic device by using a plurality of panels, and separately performs the corresponding steps that the second electronic device measures the signal quality of the K panel specific reference signals and optionally sends the first indication information to the first electronic device in the unicast scenario. For details, refer to the description of the embodiment of the unicast scenario. Details are not described herein again. Optionally, a difference from the embodiment corresponding to the unicast scenario is that for each sending panel, the first electronic device may separately specify the second electronic device to report a panel measurement result on a time-frequency resource after sweeping of the sending panel ends.

Figure 11:
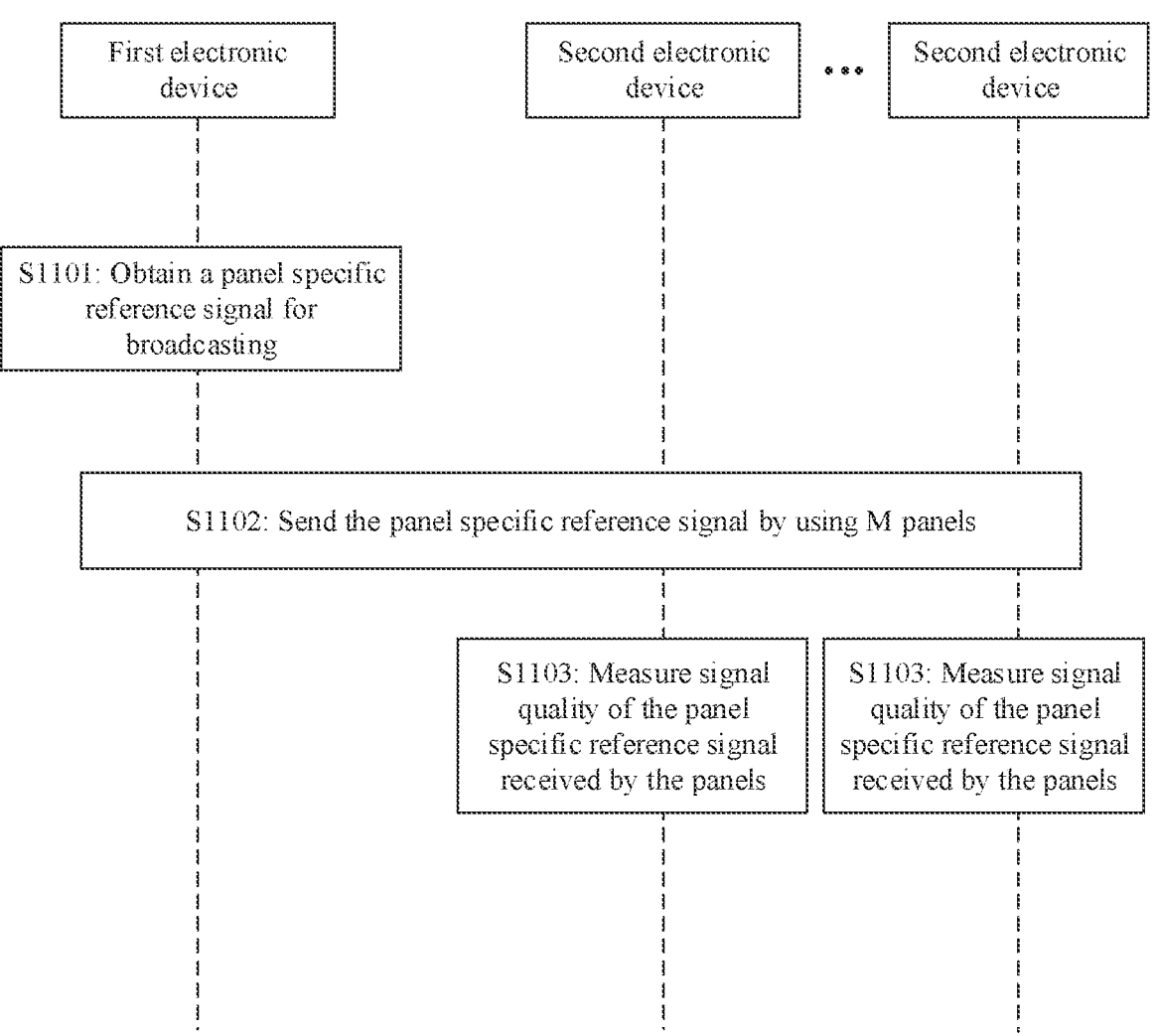
FIG. 11 is a schematic signaling flowchart of a communication method in a broadcast scenario according to an embodiment of this application.

For example, FIG. 11 is a schematic signaling flowchart of a communication method in a broadcast scenario according to an embodiment of this application.

S1101: A first electronic device obtains a panel specific reference signal for broadcasting.

S1102: The first electronic device sends the panel specific reference signal by using M panels.

S1103: One or more second electronic devices measure signal quality of the panel specific reference signal received by the panels.

In this embodiment of this application, the panel specific reference signal for broadcasting may be any one of the first panel signal to the fourth panel signal. Optionally, the pseudo-random sequence initial value of the panel specific reference signal for broadcasting is set to be a special value. For example, in PS-RSs, a PS-RS obtained when all bits of $C1_{init}$ are 0 may beset as panel reference information for broadcasting, or a PS-RS obtained when all bits of $C1_{init}$ are 1 may be set as panel reference information for broadcasting, or the panel specific reference signal dedicated for broadcasting is set based on an actual application scenario. This is not specifically limited in this embodiment of this application.

The panel specific reference signal for broadcasting may be generated by the first electronic device, or may be set in a protocol. This is not specifically limited in this embodiment of this application.

The first electronic device may send the panel specific reference signal by using the M panels, so that the one or more second electronic devices that can receive the panel specific reference signal may separately measure RSRPs of the panel specific reference signal received by each panel of the one or more second electronic devices, and learn, through blind detection, that the panel specific reference signal sent by the first electronic device is used for broadcasting. Each second electronic device may compare the RSRPs corresponding to different panels, and determine an optimal receiving panel to receive data in a broadcast application scenario. Optionally, if the second electronic device has information to be sent to the first electronic device, the second electronic device may use the optimal receiving panel as the sending panel.

Figure 12:
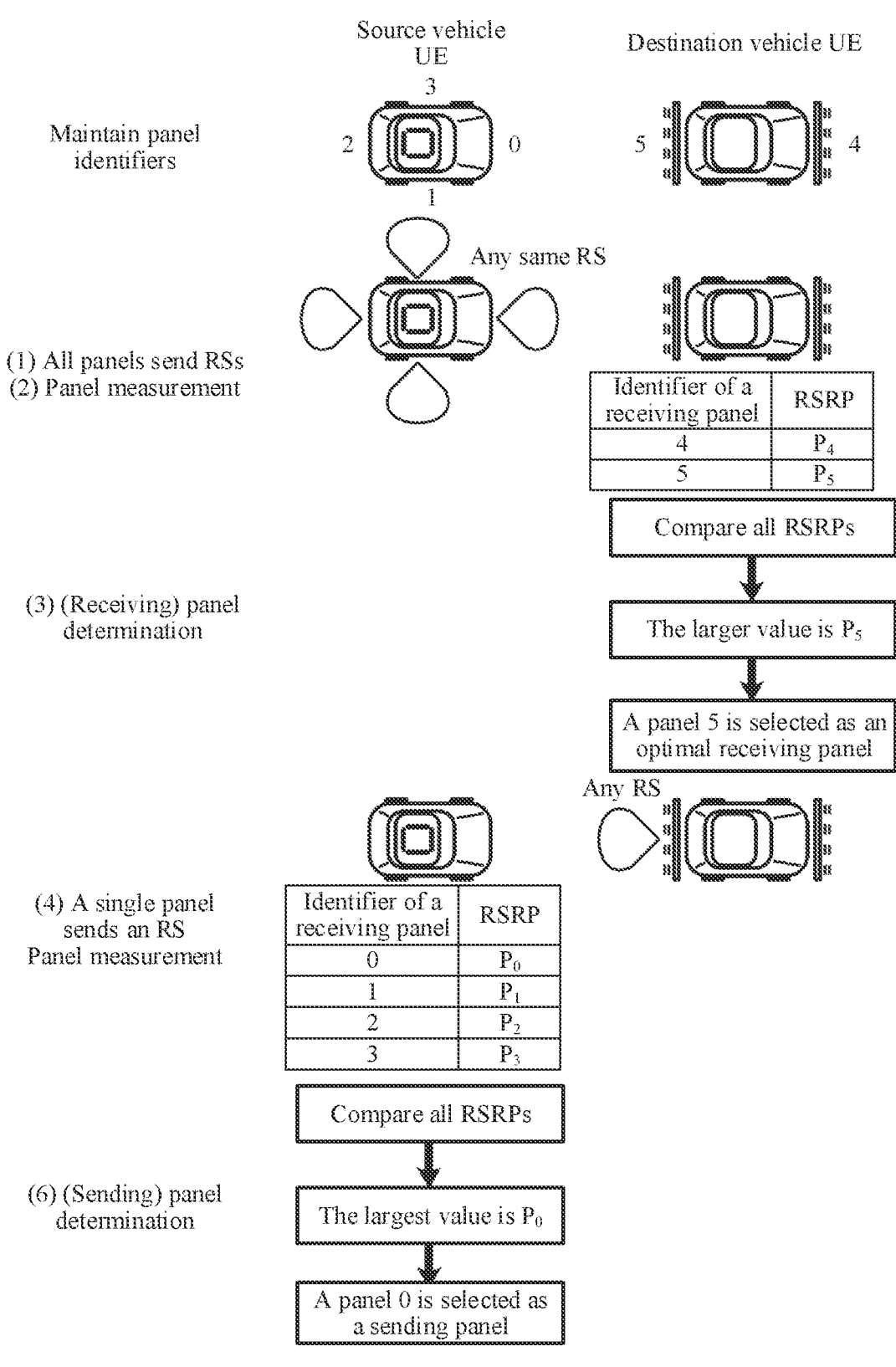
FIG. 12 is a schematic diagram of another specific scenario of a communication method in a unicast application scenario according to an embodiment of this application.

For example, FIG. 12 is a schematic diagram of another unicast application scenario in which a first electronic device is a source vehicle UE and a second electronic device is a destination vehicle UE.

It should be noted that the panel identification method, the panel specific reference signal measurement method, and the panel determining method in this embodiment are similar to those recorded in embodiments in FIG. 6 to FIG. 9. Details are not described herein again. Different from embodiments in FIG. 6 to FIG. 9, in this embodiment, panel sweeping, panel reporting, and obtaining of a panel specific reference signal need to be performed.

Specifically, in this embodiment of this application, (1) the source vehicle UE simultaneously sends signals by using all panels. The source vehicle UE may send any same reference signal in a broadcast manner by using all the panels. Optional reference signals may include a PSCCH DMRS, a PSSCH DMRS, an SL-SSB, an SL-CSI-RS, or the like in an existing protocol.

(2) Panels of the destination vehicle UE are used for measurement. The destination vehicle UE measures an RSRP of a selected reference signal by using each receiving panel. For example, $P_{j_{panel\_ID}}$ represents an RSRP measured on a panel $j_{panel\_ID}$.

(3) An optimal receiving panel of the destination vehicle UE is determined. The destination vehicle UE compares all RSRPs to determine the optimal receiving panel. Based on the panel correspondence property, the optimal receiving panel is also a sending panel that the destination vehicle UE should use to send information to the source vehicle UE. The scenario setting in FIG. 12 is used as an example. The destination vehicle UE obtains two RSRPs: $P_4$ and $P_5$. Herein, the larger value is $P_5$. The destination vehicle UE determines, based on the larger value, that a panel 5 is the optimal receiving panel.

(4) The destination vehicle UE sends a signal by using the selected panel. Corresponding to the reference signal used by the source vehicle UE, the destination vehicle UE sends a same reference signal by using the receiving panel in step (3) based on the panel correspondence property.

(5) The panels of the source vehicle UE are used for measurement. The source vehicle UE measures an RSRP of a selected reference signal by using each receiving panel. $P_{i_{panel\_ID}}$ represents an RSRP measured on a panel $i_{panel\_ID}$.

(6) A sending panel of the source vehicle UE is determined. The source vehicle UE compares all RSRPs to determine the optimal receiving panel, and determines, based on the panel correspondence property, that the optimal receiving panel is also an optimal sending panel. The scenario setting in FIG. 12 is used as an example. The source vehicle UE obtains four RSRPs: $P_0$. $P_1$, $P_2$, and $P_3$. Herein, the largest value is $P_0$. The source vehicle UE determines, based on the largest value, that a panel 0 is the optimal receiving panel and is also the optimal sending panel.

It may be understood that, for a V2X SL broadcast scenario, only steps (1), (2), and (3) in this embodiment are required.

In this embodiment of this application, the source vehicle UE does not need to obtain the panel specific reference signal, and the destination vehicle UE does not need to report a signal measurement result to the source vehicle UE either. Therefore, slot resources occupied by panel sweeping can be reduced, and a delay is low.

Figure 13:
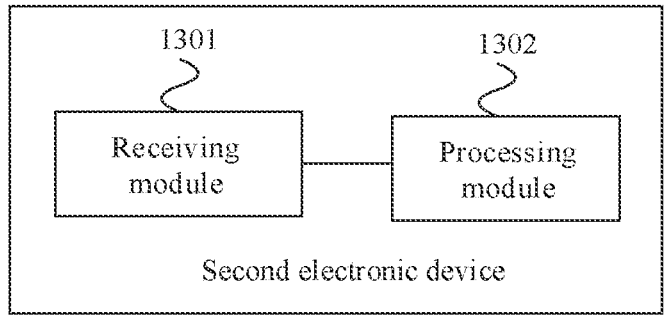
FIG. 13 is a schematic diagram of a structure of a second electronic device according to an embodiment of this application.

FIG. 13 is a schematic diagram of a structure of a second electronic device according to an embodiment of this application. The second electronic device includes: a receiving module 1301 and a processing module 1302. The receiving module is configured to receive K panel specific reference signals from a first electronic device by using N panels, where the panel specific reference signal is related to an identifier of a panel that is of the first electronic device and that sends the panel specific reference signal, and N and K are each an integer greater than or equal to 2. The processing module is configured to measure signal quality of the K panel specific reference signals.

In a possible design, the second electronic device further includes: a sending module, configured to send first indication information to the first electronic device by using a first panel, where the first panel is related to the signal quality of the K panel specific reference signals, and the first indication information is indication information related to one or more panels of the first electronic device.

In a possible design, the panel specific reference signal includes one or more of the following signals: a first panel specific reference signal, where a pseudo-random sequence initial value of the first panel specific reference signal is related to the identifier of the panel that sends the panel specific reference signal; a second panel specific reference signal, where the second panel specific reference signal is related to at least one of the following: the identifier of the panel that sends the panel specific reference signal, or a pseudo-random sequence initial value of a physical sidelink control channel demodulation reference signal PSCCH DMRS; a third panel specific reference signal, where the third panel specific reference signal is related to at least one of the following: the identifier of the panel that sends the panel specific reference signal, or a pseudo-random sequence initial value of a physical sidelink broadcast channel demodulation reference signal PSBCH DMRS; and a fourth panel specific reference signal, where the fourth panel specific reference signal is related to at least one of the following: the identifier of the panel that sends the panel specific reference signal, or a pseudo-random sequence initial value of a sidelink channel state information reference signal SL-CSI-RS.

In a possible design, for any panel that is of the first electronic device and that sends the panel specific reference signal, an identifier of the panel is $i_{panel\_ID}$;

the pseudo-random sequence initial value $C1_{init}$ of the first panel specific reference signal satisfies an equation: $C1_{init}=2^{11}(i_{panel\_ID}+1)+2^{6}(i_{panel\_ID}+1)$; and/or a pseudo-random sequence initial value $C2_{init}$ of the second panel specific reference signal satisfies an equation: $C2_{init}=(2^{1}C2_{init,0}+i_{panel\_ID})\bmod 2^{31}$, where $C2_{init,0}$ is the pseudo-random sequence initial value of the PSCCH DMRS, and 1 is related to a total quantity of panel identifiers defined in a network; and/or a pseudo-random sequence initial value $C3_{init}$ of the third panel specific reference signal satisfies an equation: $C3_{init}=(2^{1}C3_{init,0}+i_{panel\_ID})\bmod 2^{31}$, where $C3_{init,0}$ is the pseudo-random sequence initial value of the PSBCH DMRS, and 1 is related to the total quantity of the panel identifiers defined in the network; and/or a pseudo-random sequence initial value $C4_{init}$ of the fourth panel specific reference signal satisfies an equation: $C4_{init}=(2^{1}C4_{init,0}+i_{panel\_ID})\bmod 2^{31}$, where $C4_{init0}$ is the pseudo-random sequence initial value of the SL-CSI-RS, and 1 is related to the total quantity of the panel identifiers defined in the network.

In a possible design, the first indication information includes one or more pieces of panel information, and each piece of panel information includes at least one of the following: the identifier of any panel of the first electronic device and a measurement result of a reference signal corresponding to the any panel.

In a possible design, the first indication information includes one or more groups of panel information, and each group of panel information includes at least one of the following: the identifier of any panel of the first electronic device, an identifier of any panel of the second electronic device, or a measurement result of a reference signal corresponding to the group of panel information.

In a possible design, the receiving module is specifically configured to: receive the K panel specific reference signals from the first electronic device in a plurality of time units by using the N panels; or receive the K panel specific reference signals from the first electronic device in one time unit by using the N panels.

The apparatus in this embodiment may be correspondingly configured to perform the steps performed by the second electronic device in the foregoing method embodiment. Implementation principles and technical effects thereof are similar. Details are not described herein again.

Figure 14:
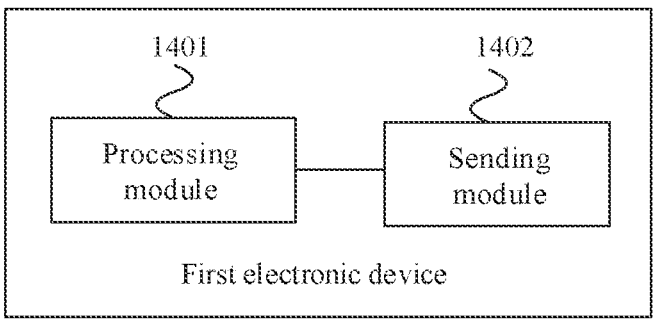
FIG. 14 is a schematic diagram of a structure of a first electronic device according to an embodiment of this application.

FIG. 14 is a schematic diagram of a structure of a first electronic device according to an embodiment of this application. The first electronic device includes: a processing module 1401 and a sending module 1402. The processing module is configured to obtain M panel specific reference signals. The sending module is configured to send K panel specific reference signals to a second electronic device by using M panels, where the first electronic device sends one or more panel specific reference signals on any one of the M panels, the panel specific reference signal is related to an identifier of a panel that sends the panel specific reference signal, M is an integer greater than or equal to 2, and K is an integer greater than or equal to M.

In a possible design, the first electronic device further includes: a receiving module, configured to receive first indication information from the second electronic device, where the first indication information is indication information related to one or more panels of the first electronic device.

In a possible design, the panel specific reference signal includes one or more of the following signals: a first panel specific reference signal, where a pseudo-random sequence initial value of the first panel specific reference signal is related to the identifier of the panel that sends the panel specific reference signal; a second panel specific reference signal, where the second panel specific reference signal is related to at least one of the following: the identifier of the panel that sends the panel specific reference signal, or a pseudo-random sequence initial value of a physical sidelink control channel demodulation reference signal PSCCH DMRS; a third panel specific reference signal, where the third panel specific reference signal is related to at least one of the following: the identifier of the panel that sends the panel specific reference signal, or a pseudo-random sequence initial value of a physical sidelink broadcast channel demodulation reference signal PSBCH DMRS; and a fourth panel specific reference signal, where the fourth panel specific reference signal is related to at least one of the following: the identifier of the panel that sends the panel specific reference signal, or a pseudo-random sequence initial value of a sidelink channel state information reference signal SL-CSI-RS.

In a possible design, for any panel that is of the first electronic device and that sends the panel specific reference signal, an identifier of the panel is $i_{panel-ID}$;

the pseudo-random sequence initial value $C1_{init}$ of the first panel specific reference signal satisfies an equation: $C1_{init}=2^{11}(i_{panel\_ID}+1)+2^{6}(i_{panel\_ID}+1)$, and/or a pseudo-random sequence initial value $C2_{init}$ of the second panel specific reference signal satisfies an equation: $C2_{init}=(2^{1}C2_{init,0}+i_{panel\_ID})\bmod 2^{31}$, where $C2_{init,0}$ is the pseudo-random sequence initial value of the PSCCH DMRS, and 1 is related to a total quantity of panel identifiers defined in a network; and/or a pseudo-random sequence initial value $C3_{init}$ of the third panel specific reference signal satisfies an equation: $C3_{init}=(2^{1}C3_{init,0}+i_{panel\_ID})\bmod 2^{31}$, where $C3_{init,0}$ is the pseudo-random sequence initial value of the PSBCH DMRS, and 1 is related to the total quantity of the panel identifiers defined in the network; and/or a pseudo-random sequence initial value $C4_{init}$ of the fourth panel specific reference signal satisfies an equation: $C4_{init}=(2^{1}C4_{init,0}+i_{panel\_ID})\bmod 2^{31}$, where $C4_{init0}$ is the pseudo-random sequence initial value of the SL-CSI-RS, and 1 is related to the total quantity of the panel identifiers defined in the network.

In a possible design, the first indication information includes one or more pieces of panel information, and each piece of panel information includes at least one of the following: the identifier of any panel of the first electronic device and a measurement result of a reference signal corresponding to the any panel.

In a possible design, the first indication information includes one or more groups of panel information, and each group of panel information includes at least one of the following: the identifier of any panel of the first electronic device, an identifier of any panel of the second electronic device, or a measurement result of a reference signal corresponding to the group of panel information.

In a possible design, the sending module is specifically configured to: send the K panel specific reference signals to the second electronic device in a plurality of time units sequentially by using the M panels; or send the K panel specific reference signals to the second electronic device in one time unit by using the M panels.

The apparatus in this embodiment may be correspondingly configured to perform the steps performed by the first electronic device in the foregoing method embodiment.

Implementation principles and technical effects thereof are similar. Details are not described herein again.

Figure 15:
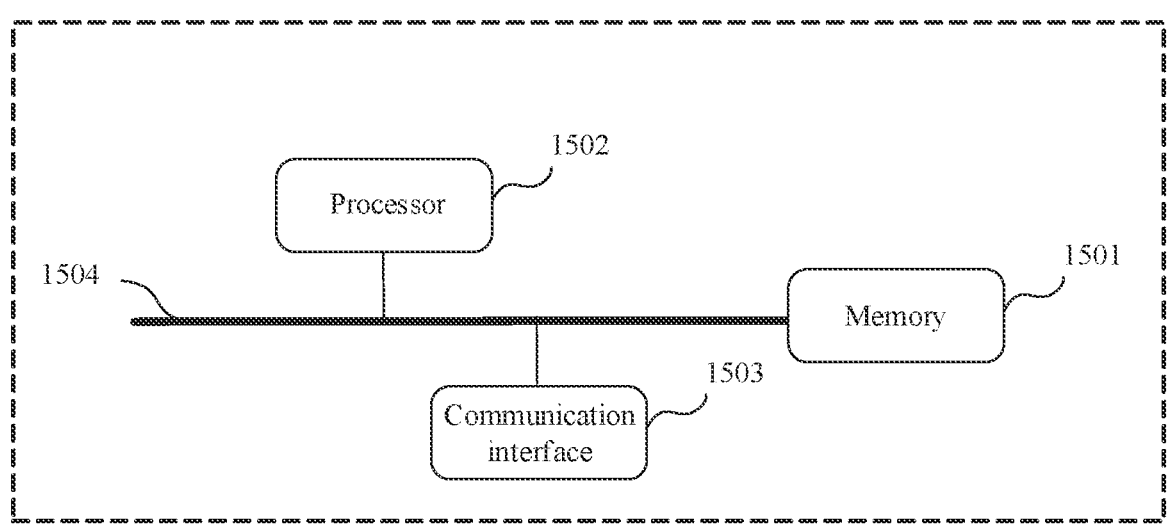
FIG. 15 is a schematic diagram of a structure of hardware of a communication apparatus according to an embodiment of this application.

FIG. 15 is a schematic diagram of a structure of hardware of a communication apparatus according to an embodiment of this application. As shown in FIG. 15, the communication apparatus includes a memory 1501, a processor 1502, and a communication interface 1503. The memory 1501, the processor 1502, and the communication interface 1503 may communicate with each other. For example, the memory 1501, the processor 1502, and the communication interface 1503 may communicate with each other by using a communication bus 1504. The memory 1501 is configured to store a computer program, and the processor 1502 executes the computer program to implement the method shown in the foregoing method embodiment.

Optionally, the communication interface 1503 may further include a transmitter and/or a receiver.

Optionally, the processor may be a central processing unit (central processing unit, CPU), or may be another general-purpose processor, a digital signal processor (digital signal processor, DSP), an application-specific integrated circuit (application specific integrated circuit, ASIC), or the like. The general-purpose processor may be a microprocessor, or the processor may be any conventional processor, or the like. The steps of the method disclosed with reference to this application may be directly performed and completed by a hardware processor, or may be performed and completed by using a combination of hardware and software modules in the processor.

This application provides a computer-readable storage medium. The computer-readable storage medium is configured to store a computer program, and the computer program is used to implement the method shown in the foregoing method embodiment.

This application further provides a communication system, including the second electronic device in FIG. 13 and the first electronic device in FIG. 14.

This application provides a system chip. The system chip is configured to support a communication apparatus in implementing functions (for example, a second electronic device receives K panel specific reference signals from a first electronic device by using N panels, where the panel specific reference signal is related to an identifier of a panel that is of the first electronic device and that sends the panel specific reference signal, and N and K are each an integer greater than or equal to 2; and the second electronic device measures signal quality of the K panel specific reference signals) shown in embodiments of this application. The chip is specifically used in a chip system, and the chip system may include a chip, or may include a chip and another discrete component. When the chip in a first device implements the foregoing method, the chip includes a processing unit. Further, the chip may include a communication unit. The processing unit may be, for example, a processor. When the chip includes a communication unit, the communication unit may be, for example, an input/output interface, a pin, or a circuit. The processing unit performs all or some actions performed by the processing modules in embodiments of this application, and the communication unit may perform a corresponding receiving or sending action. In another specific embodiment, a processing module of a receiving device in this application may be the processing unit of the chip, and a receiving module or a sending module of a control device is the communication unit of the chip.

Embodiments of this application are described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processing unit of any other programmable data processing device to generate a machine, so that the instructions executed by the computer or the processing unit of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In the several embodiments provided in this application, it should be understood that the disclosed apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objective of the solutions of embodiments.

In addition, functional units in embodiments of this application may be integrated into one processing unit, each of the units may exist alone physically, or two or more units may be integrated into one unit. The integrated unit may be implemented through hardware, or may also be implemented in a form of hardware plus a software functional unit.

When the foregoing integrated unit is implemented in a form of a software functional unit, the integrated unit may be stored in a computer-readable storage medium. The software functional unit is stored in a storage medium, and contains several instructions for instructing computer equipment (for example, a personal computer, a server, or a network device) or a processor (processor) to perform some steps of the methods in embodiments of this application. The foregoing storage medium includes various media that can store program code, such as a USB flash drive, a removable hard disk, a read-only memory (Read-Only Memory, ROM), a random access memory (Random Access Memory, RAM), a magnetic disk, or an optical disc.

What is claimed is:

1. A communication method, comprising:

receiving, by a second electronic device, K panel specific reference signals from a first electronic device by using N panels, wherein a pseudo-random sequence initial value of each of the K panel specific reference signals is related to an identifier of a panel that is of the first electronic device and that sends the respective panel specific reference signal, and N and K are each an integer greater than or equal to 2, wherein the K panel specific reference signals comprise one or more of the following signals:

a first panel specific reference signal, wherein a pseudo-random sequence initial value of the first panel specific reference signal is determined based on an identifier of the panel that sends the panel specific reference signal;

a second panel specific reference signal, wherein a pseudo-random sequence initial value of the second panel specific reference signal is determined based on the identifier of the panel that sends the panel specific reference signal and a pseudo-random sequence initial value of a physical sidelink control channel demodulation reference signal (PSCCH DMRS);

a third panel specific reference signal, wherein a pseudo-random sequence initial value of the third panel specific reference signal is determined based on the identifier of the panel that sends the panel specific reference signal and a pseudo-random sequence initial value of a physical sidelink broadcast channel demodulation reference signal (PSBCH DMRS); or a fourth panel specific reference signal, wherein a pseudo-random sequence initial value of the fourth panel specific reference signal is determined based on the identifier of the panel that sends the panel specific reference signal and a pseudo-random sequence initial value of a sidelink channel state information reference signal (SL-CSI-RS); and wherein for any panel that is of the first electronic device and that sends one of the K panel specific reference signals, an identifier of the panel is $i_{panel\text{-}ID}$; and at least one of the following is true:

a pseudo-random sequence initial value $C1_{init}$ of the first panel specific reference signal satisfies an equation: $C1_{init}=2^{11}(i_{panel\_ID}+1)+2^6(i_{panel\_ID}+1)$; or a pseudo-random sequence initial value $C2_{init}$ of the second panel specific reference signal satisfies an equation: $C2_{init}=(2^1 C2_{init,0}+i_{panel\_ID})\mathrm{mod}\ 2^{31}$, wherein $C2_{init,0}$ is the pseudo-random sequence initial value of the PSCCH DMRS, and 1 is related to a total quantity of panel identifiers defined in a network; or a pseudo-random sequence initial value $C3_{init}$ of the third panel specific reference signal satisfies an equation: $C3_{init}=(2^1 C3_{init,0}+i_{panel\_ID})\mathrm{mod}\ 2^{31}$, wherein $C3_{init,0}$ is the pseudo-random sequence initial value of the PSBCH DMRS, and 1 is related to the total quantity of the panel identifiers defined in the network; or a pseudo-random sequence initial value $C4_{init}$ of the fourth panel specific reference signal satisfies an equation: $C4_{init}=(2^1 C4_{init,0}+i_{panel\_ID})\mathrm{mod}\ 2^{31}$, wherein $C4_{init,0}$ is the pseudo-random sequence initial value of the SL-CSI-RS, and 1 is related to the total quantity of the panel identifiers defined in the network measuring, by the second electronic device, signal quality of the K panel specific reference signals.

2. The method according to claim 1, further comprising:

sending, by the second electronic device, first indication information to the first electronic device by using a first panel, wherein the first panel is related to the signal quality of the K panel specific reference signals, and the first indication information is indication information related to one or more panels of the first electronic device.

3. The method according to claim 2, wherein the first indication information comprises one or more pieces of panel information, and each piece of panel information comprises at least one of the following: the identifier of a panel of the first electronic device or a measurement result of a reference signal corresponding to the panel.

4. The method according to claim 2, wherein the first indication information comprises one or more groups of panel information, and each group of panel information comprises at least one of the following: the identifier of a panel of the first electronic device, an identifier of a panel of the second electronic device, or a measurement result of a reference signal corresponding to the group of panel information.

5. The method according to claim 1, wherein the receiving, by a second electronic device, K panel specific reference signals from a first electronic device by using N panels comprises:

receiving, by the second electronic device, the K panel specific reference signals from the first electronic device in a plurality of time units by using the N panels; or receiving, by the second electronic device, the K panel specific reference signals from the first electronic device in one time unit by using the N panels.

6. A communication method, comprising:

obtaining, by a first electronic device, M panel specific reference signals; and sending, by the first electronic device, K panel specific reference signals to a second electronic device by using M panels, wherein the first electronic device sends one or more of the K panel specific reference signals on any one of the M panels, wherein a pseudo-random sequence initial value of each of the K panel specific reference signals is related to an identifier of a panel that sends the respective panel specific reference signal, M is an integer greater than or equal to 2, and K is an integer greater than or equal to M, wherein the K panel specific reference signals comprise one or more of the following signals:

a first panel specific reference signal, wherein a pseudo-random sequence initial value of the first panel specific reference signal is determined based on an identifier of the panel that sends the panel specific reference signal;

a second panel specific reference signal, wherein a pseudo-random sequence initial value of the second panel specific reference signal is determined based on the identifier of the panel that sends the panel specific reference signal and a pseudo-random sequence initial value of a physical sidelink control channel demodulation reference signal (PSCCH DMRS);

a third panel specific reference signal, wherein a pseudo-random sequence initial value of the third panel specific reference signal is determined based on the identifier of the panel that sends the panel specific reference signal and a pseudo-random sequence initial value of a physical sidelink broadcast channel demodulation reference signal (PSBCH DMRS); or a fourth panel specific reference signal, wherein a pseudo-random sequence initial value of the fourth panel specific reference signal is determined based on the identifier of the panel that sends the panel specific reference signal and a pseudo-random sequence initial value of a sidelink channel state information reference signal (SL-CSI-RS), and wherein for any panel that is of the first electronic device and that sends one of the K panel specific reference signals an identifier of the panel is $i_{panel\text{-}ID}$; and at least one of the following is true:

a pseudo-random sequence initial value $C1_{init}$ of the first panel specific reference signal satisfies an equation: $C1_{init}=2^{11}(i_{panel\_ID}+1)+2^{6}(i_{panel\_ID}+1)$; or a pseudo-random sequence initial value $C2_{init}$ of the second panel specific reference signal satisfies an equation: $C2_{init}=(2^{1}C2_{init,0}+i_{panel\_ID})\bmod 2^{31}$, wherein $C2_{init,0}$ is the pseudo-random sequence initial value of the PSCCH DMRS, and 1 is related to a total quantity of panel identifiers defined in a network; or a pseudo-random sequence initial value $C3_{init}$ of the third panel specific reference signal satisfies an equation: $C3_{init}=(2^{1}C3_{init,0}+i_{panel\_ID})\bmod 2^{31}$ wherein $C3_{init,0}$ is the pseudo-random sequence initial value of the PSBCH DMRS, and 1 is related to the total quantity of the panel identifiers defined in the network; or a pseudo-random sequence initial value $C4_{init}$ of the fourth panel specific reference signal satisfies an equation: $C4_{init}=(2^{1}C4_{init,0}+i_{panel\_ID})\bmod 2^{31}$, wherein $C4_{init,0}$ is the pseudo-random sequence initial value of the SL-CSI-RS, and 1 is related to the total quantity of the panel identifiers defined in the network.

7. The method according to claim 6, further comprising:

receiving, by the first electronic device, first indication information from the second electronic device, wherein the first indication information is indication information related to one or more panels of the first electronic device.

8. The method according to claim 7, wherein the first indication information comprises one or more pieces of panel information, and each piece of panel information comprises at least one of the following: the identifier of a panel of the first electronic device and a measurement result of a reference signal corresponding to the panel; or the first indication information comprises one or more groups of panel information, and each group of panel information comprises at least one of the following: the identifier of a panel of the first electronic device, an identifier of a panel of the second electronic device, or a measurement result of a reference signal corresponding to the group of panel information.

9. The method according to claim 6, wherein the sending, by the first electronic device, K panel specific reference signals to a second electronic device by using M panels comprises:

sending, by the first electronic device, the K panel specific reference signals to the second electronic device in a plurality of time units sequentially by using the M panels, or sending, by the first electronic device, the K panel specific reference signals to the second electronic device in one time unit by using the M panels.

10. An apparatus, comprising:

at least one processor; and one or more memories coupled to the at least one processor and storing programming instructions for execution by the at least one processor, cause the apparatus to:

receive K panel specific reference signals from a first electronic device by using N panels, wherein a pseudo-random sequence initial value of each of the K panel specific reference signals is related to an identifier of a panel that is of the first electronic device and that sends the respective panel specific reference signal, and N and K are each an integer greater than or equal to 2, wherein the K panel specific reference signals comprise one or more of the following signals:

a first panel specific reference signal, wherein a pseudo-random sequence initial value of the first panel specific reference signal is determined based on an identifier of the panel that sends the panel specific reference signal;

a second panel specific reference signal, wherein a pseudo-random sequence initial value of the second panel specific reference signal is determined based on the identifier of the panel that sends the panel specific reference signal and a pseudo-random sequence initial value of a physical sidelink control channel demodulation reference signal (PSCCH DMRS);

a third panel specific reference signal, wherein a pseudo-random sequence initial value of the third panel specific reference signal is determined based on the identifier of the panel that sends the panel specific reference signal and a pseudo-random sequence initial value of a physical sidelink broadcast channel demodulation reference signal (PSBCH DMRS); or a fourth panel specific reference signal, wherein a pseudo-random sequence initial value of the fourth panel specific reference signal is determined based on the identifier of the panel that sends the panel specific reference signal and a pseudo-random sequence initial value of a sidelink channel state information reference signal (SL-CSI-RS), and wherein for any panel that is of the first electronic device and that sends one of the K panel specific reference signals, an identifier of the panel is $i_{panel\text{-}ID}$; and at least one of the following is true:

a pseudo-random sequence initial value $C1_{init}$ of the first panel specific reference signal satisfies an equation: $C1_{init}=2^{11}(i_{panel\_ID}+1)+2^{6}(i_{panel\_ID}+1)$; or a pseudo-random sequence initial value $C2_{init}$ of the second panel specific reference signal satisfies an equation: $C2_{init}=(2^1 C2_{init,0}+i_{panel\_ID})\mathrm{mod}\ 2^{31}$, wherein $C2_{init,0}$ is the pseudo-random sequence initial value of the PSCCH DMRS, and 1 is related to a total quantity of panel identifiers defined in a network; or a pseudo-random sequence initial value $C3_{init}$ of the third panel specific reference signal satisfies an equation: $C3_{init}=(2^1 C3_{init,0}+i_{panel\_ID})\mathrm{mod}\ 2^{31}$, wherein $C3_{init,0}$ is the pseudo-random sequence initial value of the PSBCH DMRS, and 1 is related to the total quantity of the panel identifiers defined in the network; or a pseudo-random sequence initial value $C4_{init}$ of the fourth panel specific reference signal satisfies an equation: $C4_{init}=(2^1 C4_{init,0}+i_{panel\_ID})\mathrm{mod}\ 2^{31}$, wherein $C4_{init,0}$ is the pseudo-random sequence initial value of the SL-CSI-RS, and 1 is related to the total quantity of the panel identifiers defined in the network; and measure signal quality of the K panel specific reference signals.

11. The apparatus according to claim 10, wherein the programming instructions, when executed by the at least one processor, further cause the apparatus to:

send first indication information to the first electronic device by using a first panel, wherein the first panel is related to the signal quality of the K panel specific reference signals, and the first indication information is indication information related to one or more panels of the first electronic device.

12. The apparatus according to claim 11, wherein the first indication information comprises one or more pieces of panel information, and each piece of panel information comprises at least one of the following: the identifier of a panel of the first electronic device or a measurement result of a reference signal corresponding to the panel; or the first indication information comprises one or more groups of panel information, and each group of panel information comprises at least one of the following: the identifier of a panel of the first electronic device, an identifier of a panel of the apparatus, or a measurement result of a reference signal corresponding to the group of panel information.

13. The apparatus according to claim 10, wherein the programming instructions, when executed by the at least one processor, cause the apparatus to receive K panel specific reference signals from a first electronic device by using N panels comprises:

receiving the K panel specific reference signals from the first electronic device in a plurality of time units by using the N panels; or receiving the K panel specific reference signals from the first electronic device in one time unit by using the N panels.

14. The method according to claim 1, wherein at least one panel specific reference signal of the K panel specific reference signals comprises a pseudo-random sequence.

15. The method according to claim 14, wherein the pseudo-random sequence is a gold sequence.

16. The method according to claim 1, wherein each panel specific reference signal of the K panel specific reference signals comprises a pseudo-random sequence.

17. The method according to claim 16, wherein the pseudo-random sequence is a gold sequence.

18. The apparatus according to claim 10, wherein at least one panel specific reference signal of the K panel specific reference signals comprises a pseudo-random sequence.

19. The apparatus according to claim 18, wherein the pseudo-random sequence is a gold sequence.

20. The apparatus according to claim 10, wherein each panel specific reference signal of the K panel specific reference signals comprises a pseudo-random sequence.

* * * * *